Figure 1:
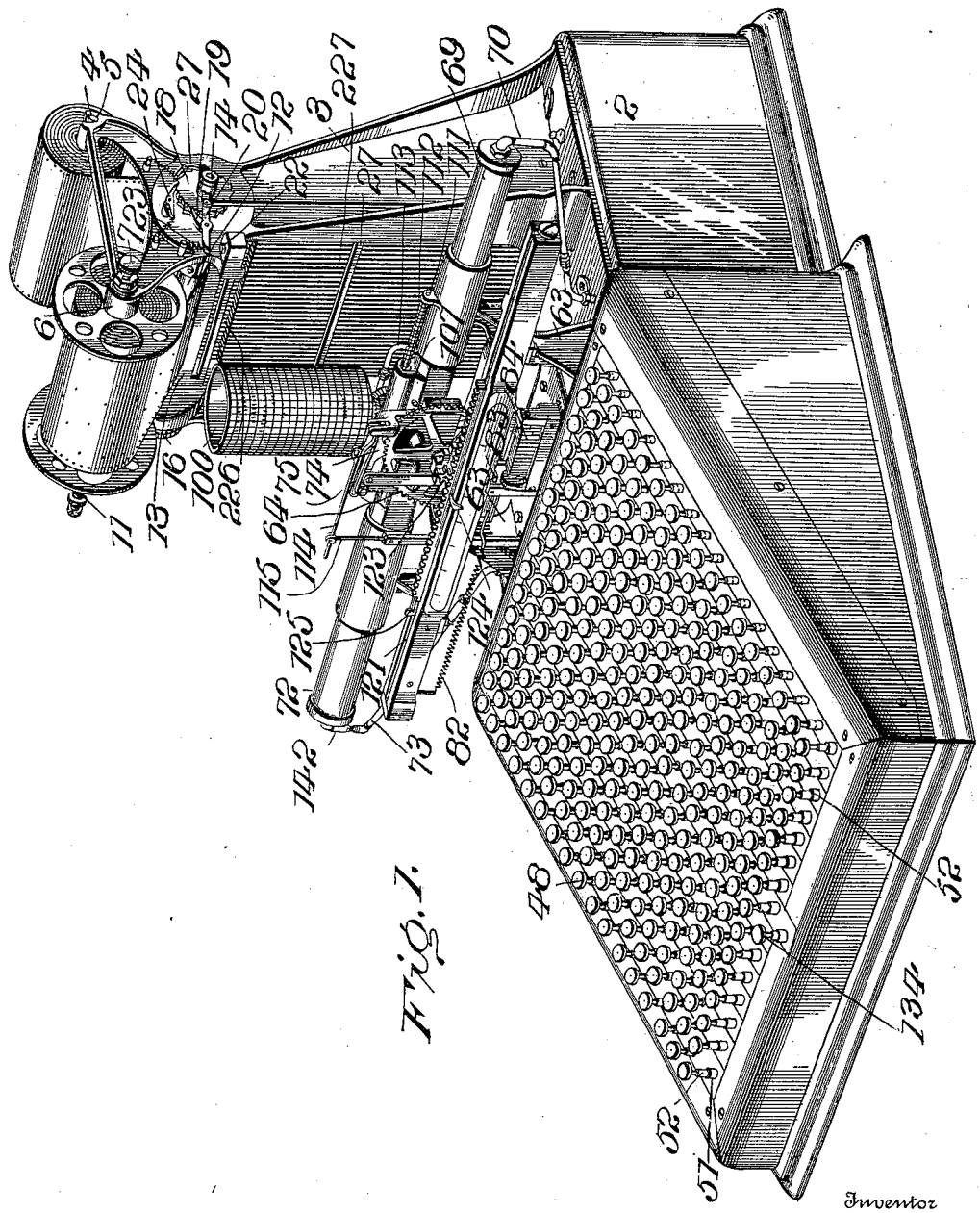

No. 654,115. Patented July 17, 1900.
T. LANSTON.
MACHINE FOR PERFORATING STRIPS.
(Application filed June 27, 1899.)
(No Model.) 16 Sheets—Sheet 2.

No. 654,115. Patented July 17, 1900.
T. LANSTON.
MACHINE FOR PERFORATING STRIPS.
(Application filed June 27, 1899.)
(No Model.) 16 Sheets—Sheet 3.

No. 654,115. Patented July 17, 1900.
T. LANSTON.
MACHINE FOR PERFORATING STRIPS.
(Application filed June 27, 1899.)
(No Model.) 16 Sheets—Sheet 4.

No. 654,115.  
T. LANSTON.  
MACHINE FOR PERFORATING STRIPS.  
(Application filed June 27, 1899.)  
Patented July 17, 1900.

(No Model.)

Witnesses  
Inventor  
Talbert Lanston  
his Attorneys

No. 654,115. Patented July 17, 1900.
T. LANSTON.
MACHINE FOR PERFORATING STRIPS.
(Application filed June 27, 1899.)
(No Model.) 16 Sheets—Sheet 6.

Witnesses  
Inventor  
Talbut Lanston  
by Church & Church  
his Attorneys.

No. 654,115. Patented July 17, 1900.
T. LANSTON.
MACHINE FOR PERFORATING STRIPS.
(Application filed June 27, 1899.)

(No Model.) 16 Sheets—Sheet 8.

No. 654,115. Patented July 17, 1900.
T. LANSTON.
MACHINE FOR PERFORATING STRIPS.
(Application filed June 27, 1899.)
(No Model.) 16 Sheets—Sheet 9.
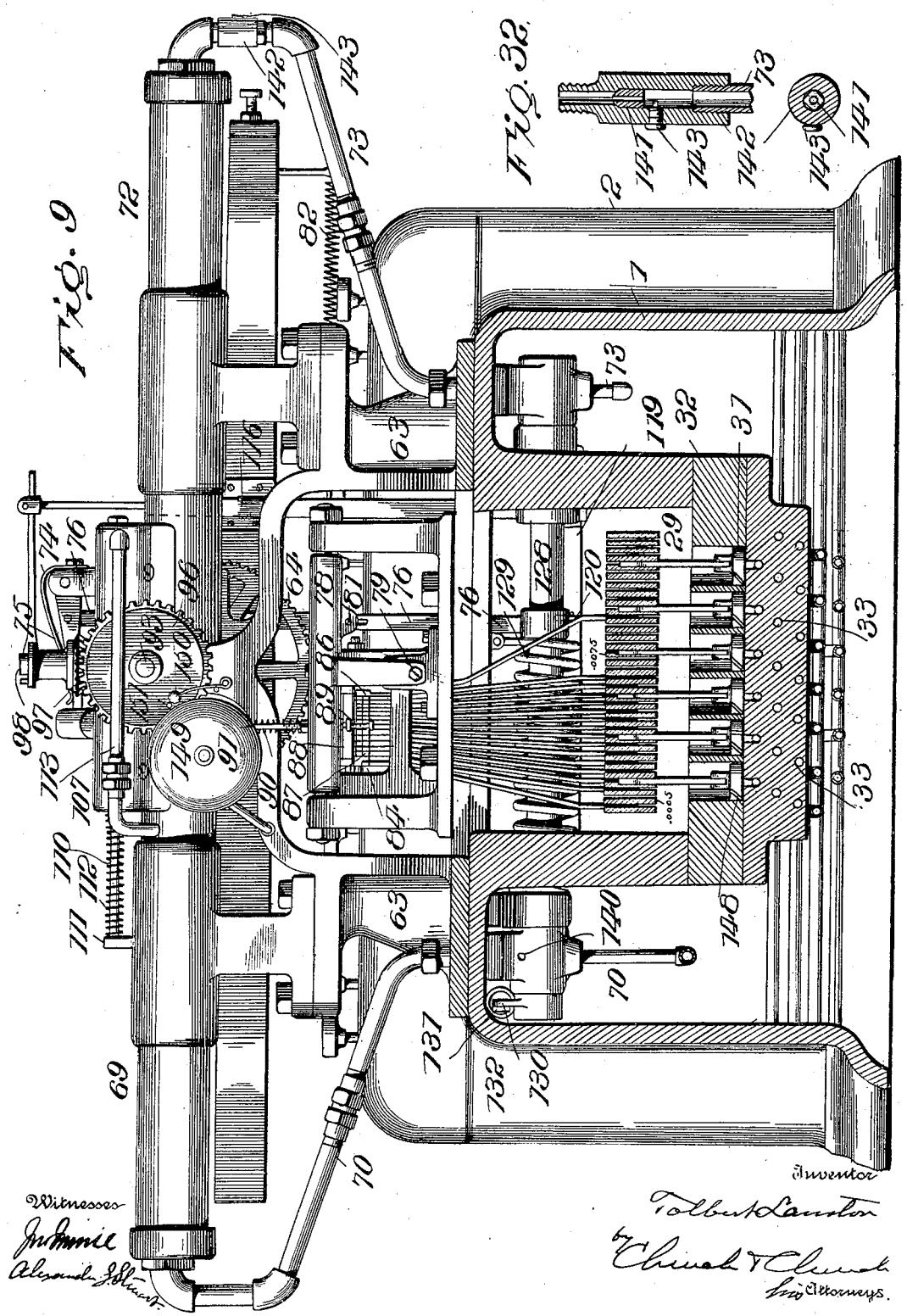

No. 654,115. Patented July 17, 1900.
T. LANSTON.
MACHINE FOR PERFORATING STRIPS.
(Application filed June 27, 1899.)
(No Model.) 16 Sheets—Sheet 10.
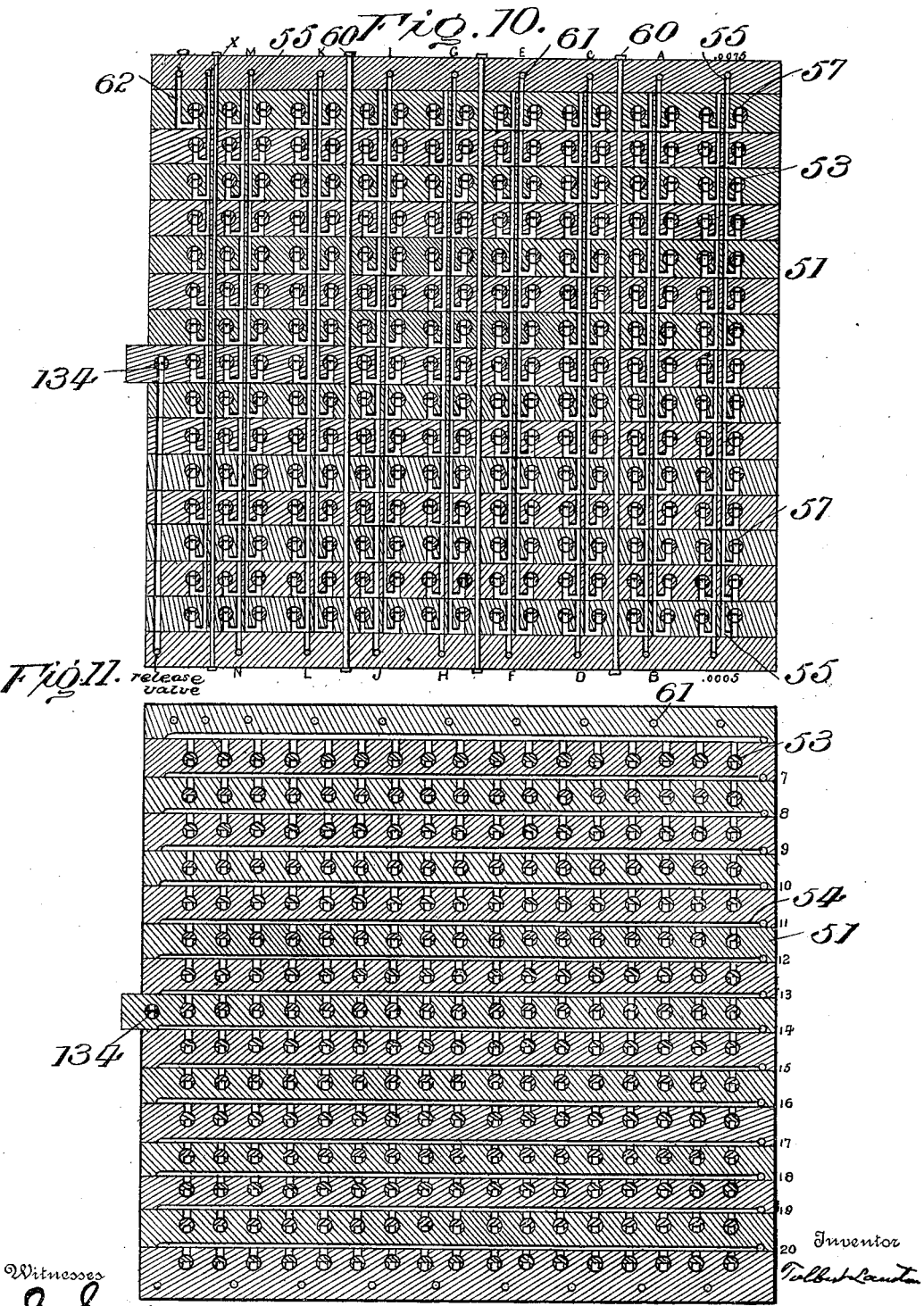

No. 654,115. Patented July 17, 1900.
T. LANSTON.
MACHINE FOR PERFORATING STRIPS.
(Application filed June 27, 1899.)
(No Model.) 16 Sheets—Sheet 11.
Fig. 13.
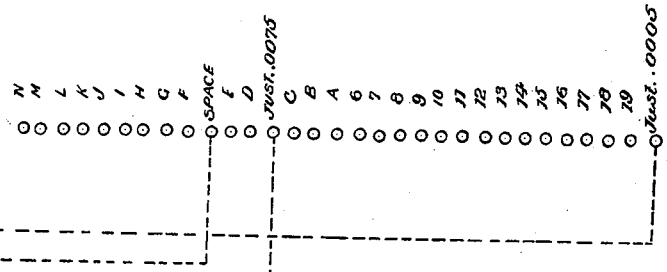

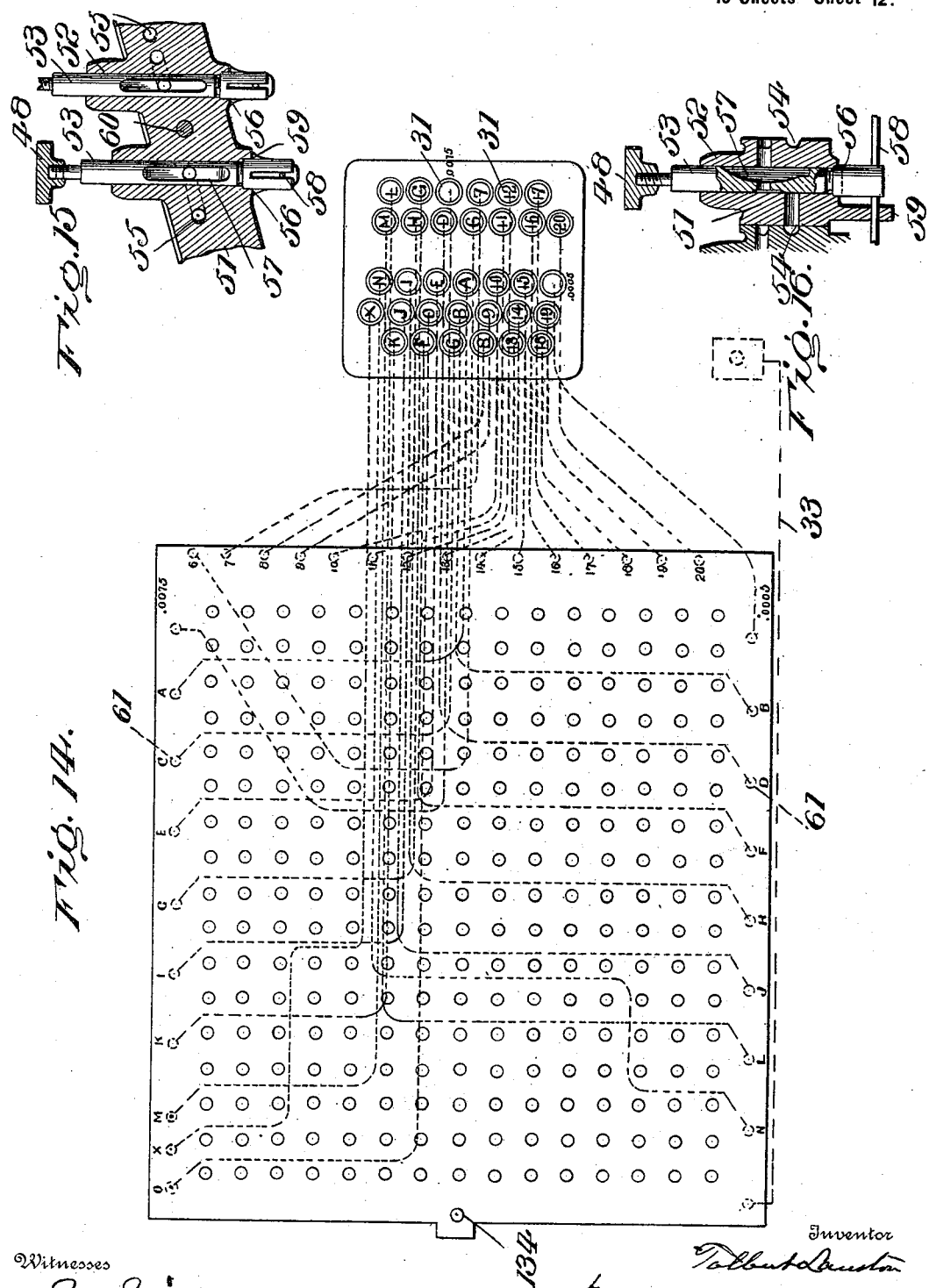

No. 654,115. Patented July 17, 1900.
T. LANSTON.
MACHINE FOR PERFORATING STRIPS.
(Application filed June 27, 1899.)
(No Model.) 16 Sheets—Sheet 13.
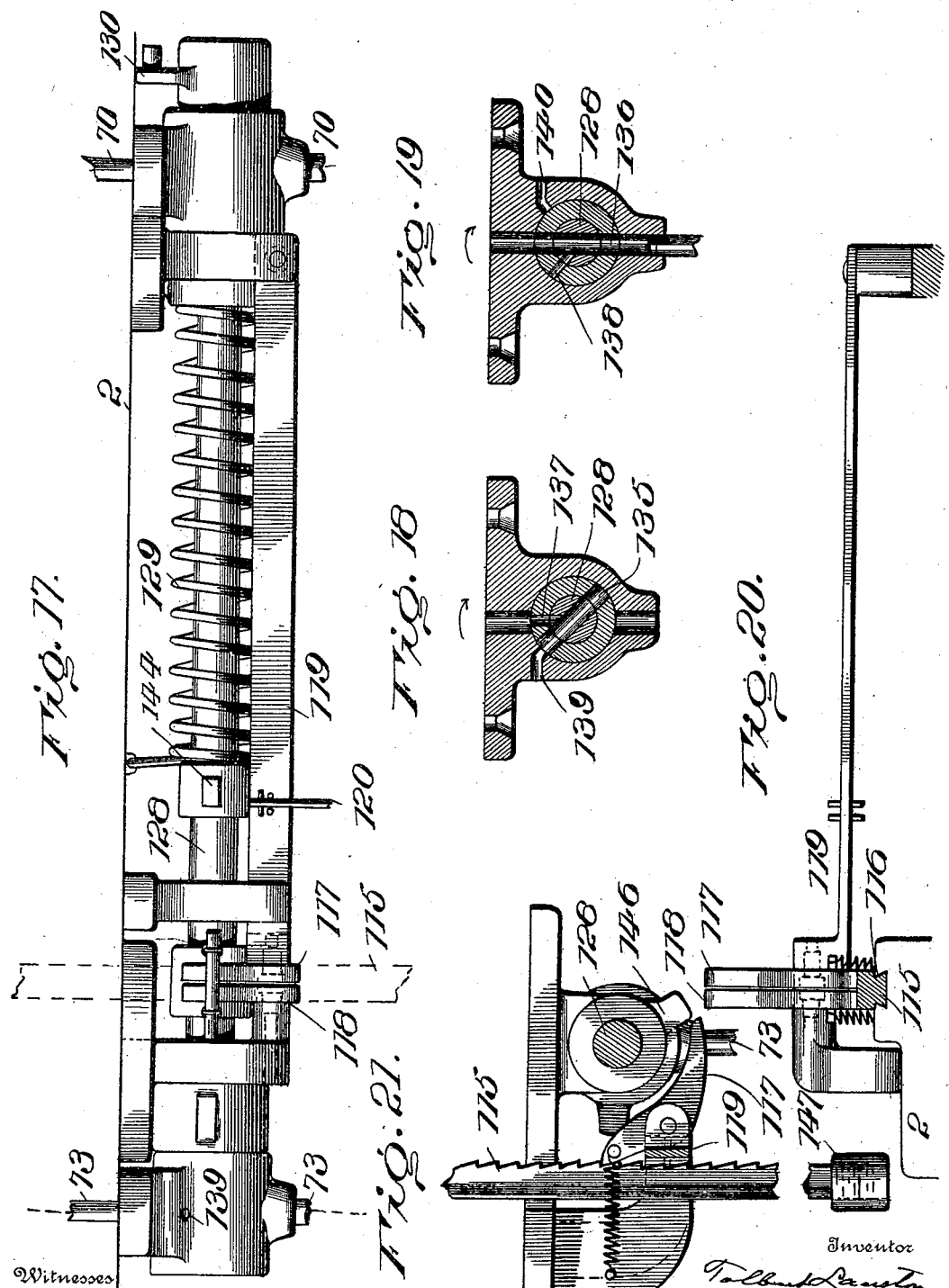

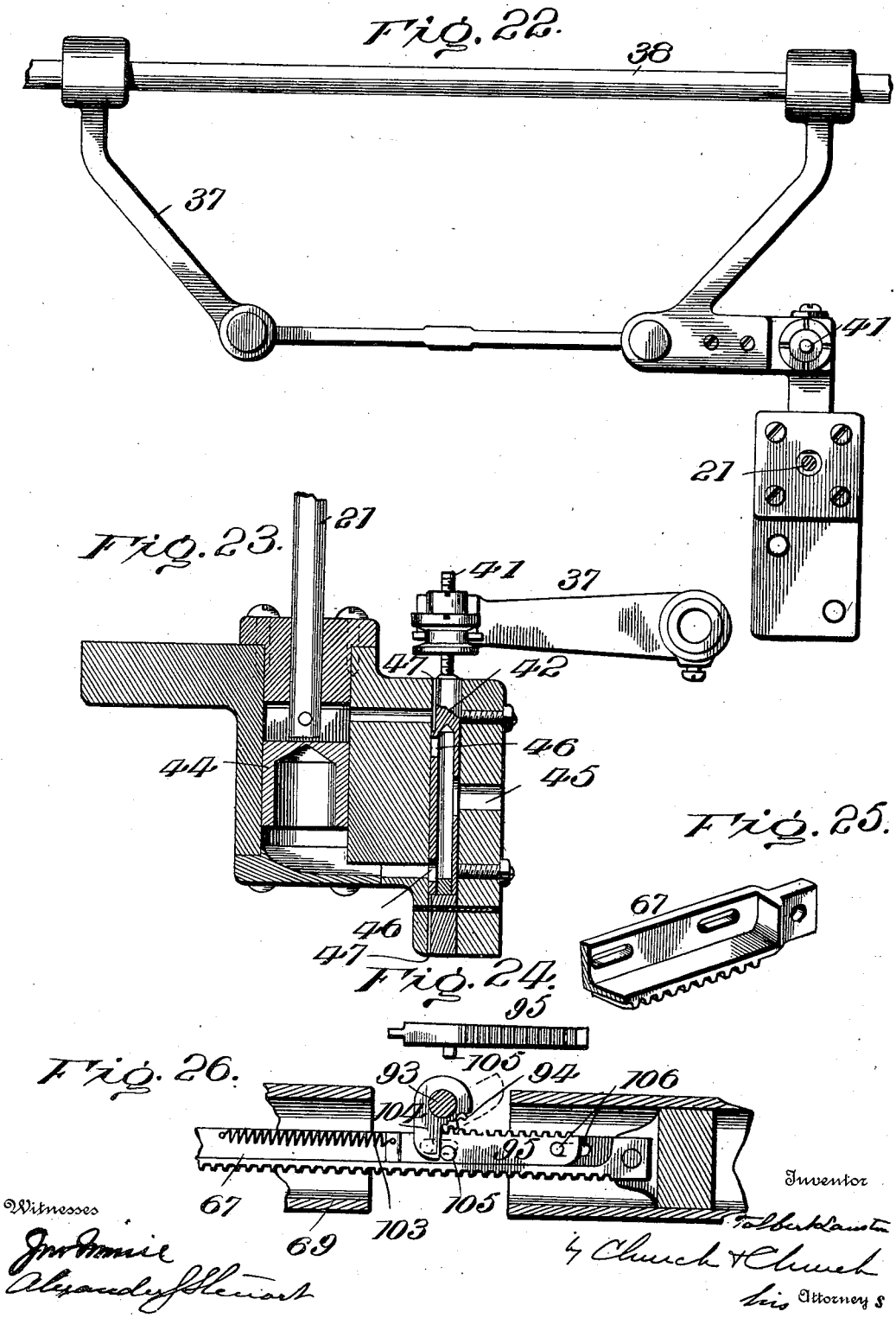

No. 654,115. Patented July 17, 1900.
T. LANSTON.
MACHINE FOR PERFORATING STRIPS.
(Application filed June 27, 1899.)
(No Model.) 16 Sheets—Sheet 15.
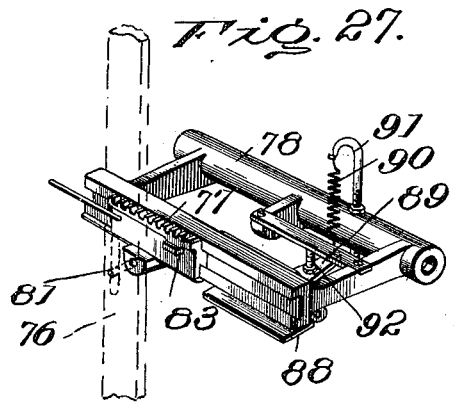
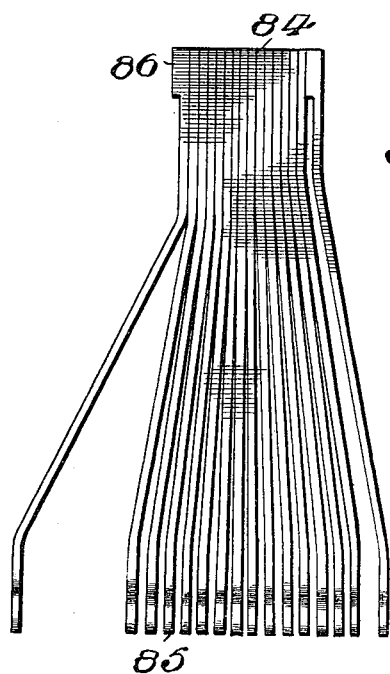
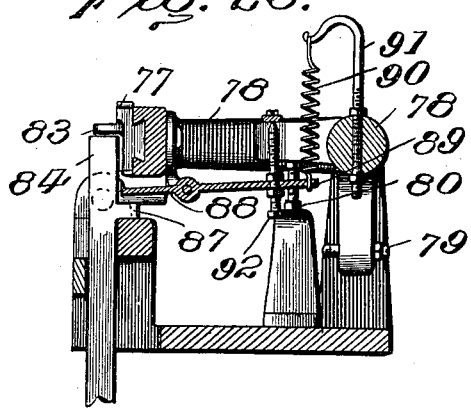
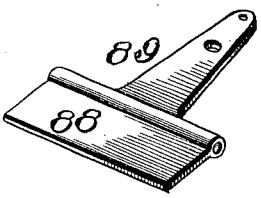
Witnesses
Inventor
Tolbert Lanston
by Church & Church
his Attorneys

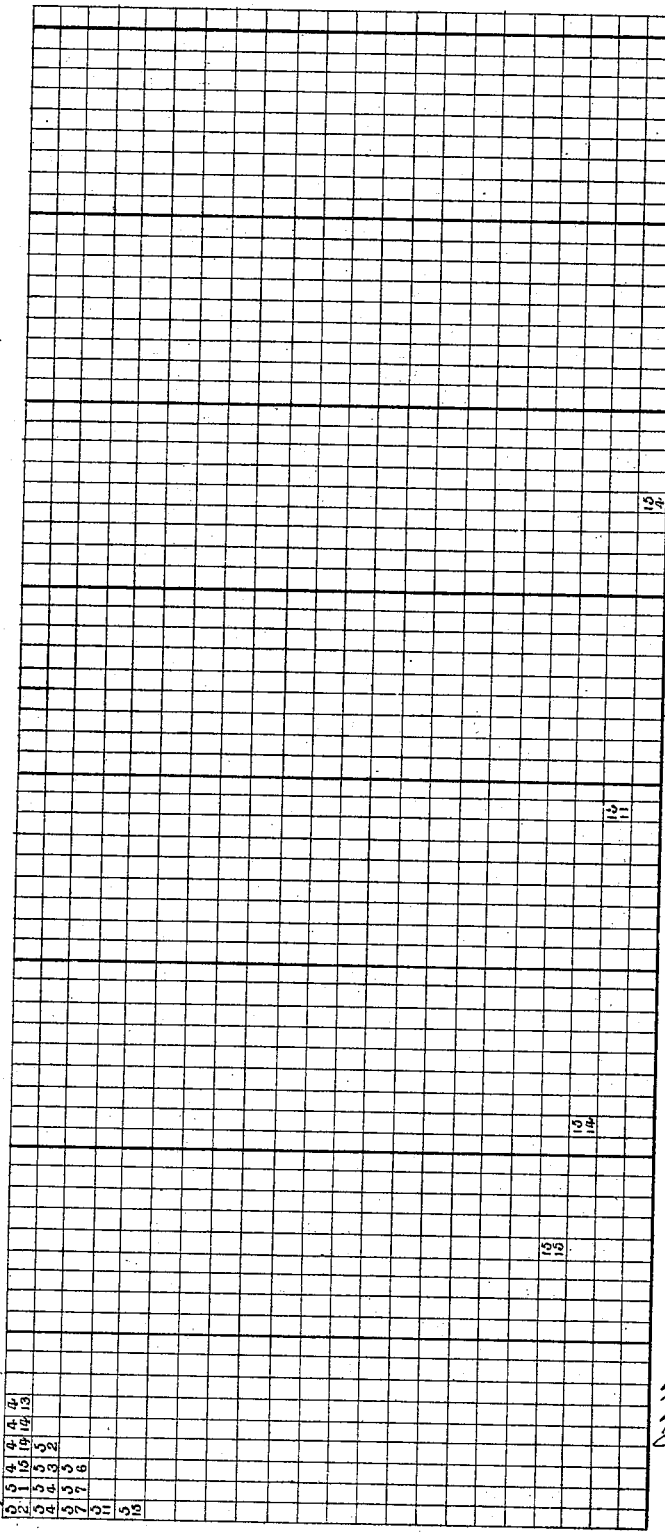

UNITED STATES PATENT OFFICE.

TOLBERT LANSTON, OF WASHINGTON, DISTRICT OF COLUMBIA.

MACHINE FOR PERFORATING STRIPS.

SPECIFICATION forming part of Letters Patent No. 654,115, dated July 17, 1900.

Application filed June 27, 1899. Serial No. 722,062. (No model.)

*To all whom it may concern:*

Be it known that I, TOLBERT LANSTON, a citizen of the United States, and a resident of Washington, in the District of Columbia, have invented certain new and useful Improvements in Machines for Preparing the Perforated Record-Strips of Type-Forming Machines; and I do hereby declare the following to be a full, clear, and exact description of the same, reference being had to the accompanying drawings, forming a part of this specification, and to the figures of reference marked thereon.

The present invention relates, generically, to improvements in controllable perforating mechanisms, and specifically to the class of manually-controlled or keyboard punching-machines—such, for example, as those employed in connection with the "Lanston Monotype" and similar systems—for the production or preparation of perforated record strips or controllers, the latter being utilized to govern or control other mechanisms, such as type-making machinery, in the production of printing characters.

Although, as will be obvious, numerous features of the invention are applicable to other styles and varieties of perforating-machines, the several improvements are shown as embodied in a perforating-machine designed to accomplish the same class of work and adapted to the same system as the perforating-machine forming the subject of Letters Patent No. 590,763, dated September 28, 1897—that is to say, this machine, like that of the patent referred to, is specially organized to produce a perforated record strip or controller for governing a type-making machine, the perforations representing by their number and relative arrangement the characters, spaces, justification-adjustments, &c. While the said points of similarity exist between the patented apparatus and the present invention, by the present improvements the mechanisms for accomplishing the desired ends are greatly simplified, and while such mechanisms are controlled by the operator the labor of controlling the same is materially reduced by the employment of intermediate power mechanism, (in the present machine compressed air,) and generally more accurate and complete results are attained, particularly with respect to the justification indications, the machine indicating to the operator exactly which justification-keys are to be struck in order to produce a record for a completely-justified line, thereby eliminating all necessity for mental calculation and the consequent liability of error.

Generally speaking, while the mechanism is an organized whole designed for accomplishing a unitary result embodied in the record strip or controller, yet for the purposes of detail, description, and the more ready understanding of the mechanical elements organized to produce such result the mechanism may be divided into groups—such as, first, the paper-feeding mechanism for advancing the strip or ribbon at regular intervals and holding it in position to receive the punches; second, the designating or punching mechanism by means of which the appropriate designations or perforations are made in the record-strip, said perforations being properly distributed and combined, so as to represent and control the production of the separate types, points, spaces, &c., pertaining to the selected font, while certain other perforations control the setting of the justifying mechanism to vary the thickness of the bodies (preferably only certain selected bodies, as space-type) setwise and to inaugurate the movement of the galley mechanism at the completion of each line; third, the keyboard or finger mechanism operating either mediately or immediately upon other mechanisms to control their movements; fourth, the justifying-indicator for indicating to the operator the appropriate justification-keys to be operated to make perforations for a properly-justified line; fifth, a line-indicator for indicating the length of line, the number of units occupied by the designated characters, and the number of units remaining unfilled in a line, and, sixth, the resetting mechanism for restoring the parts, particularly the indicating mechanism, to the zero-point ready for subsequent operations.

The details of the several mechanisms and their corelation will be now described, the particular features of novelty of the said invention being set forth in the appended claims.

Figure 2:
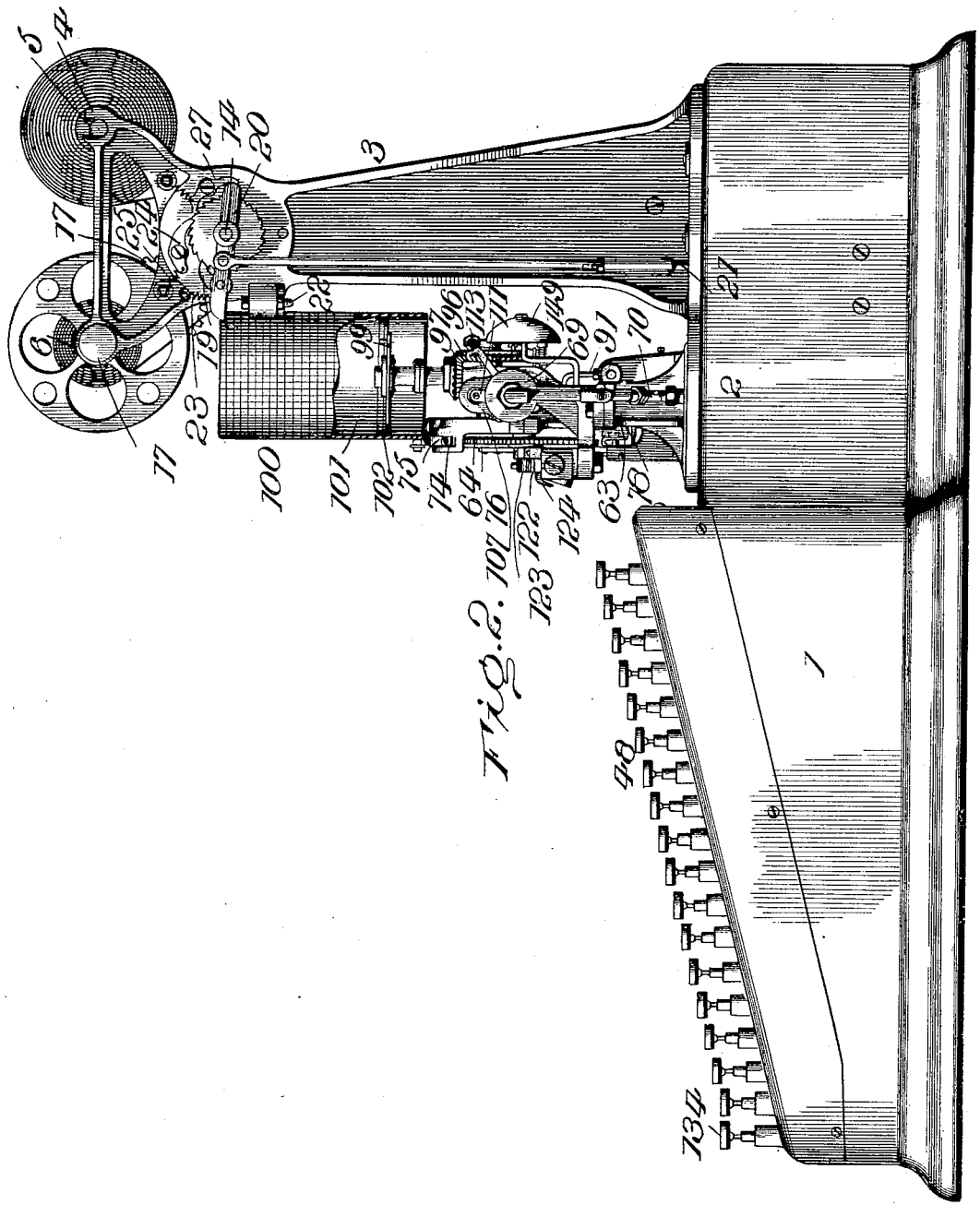
Figure 3:
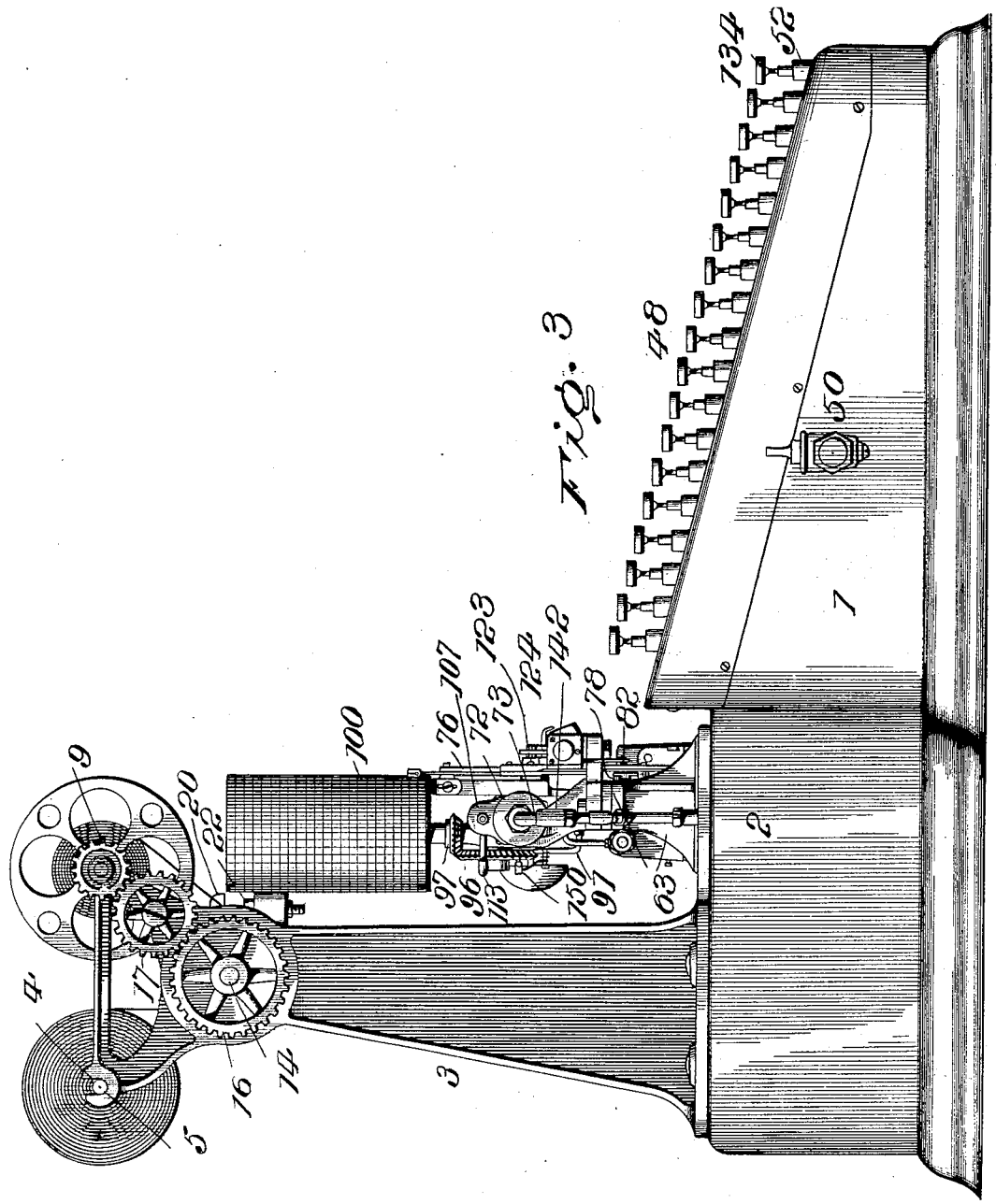
Figure 4:
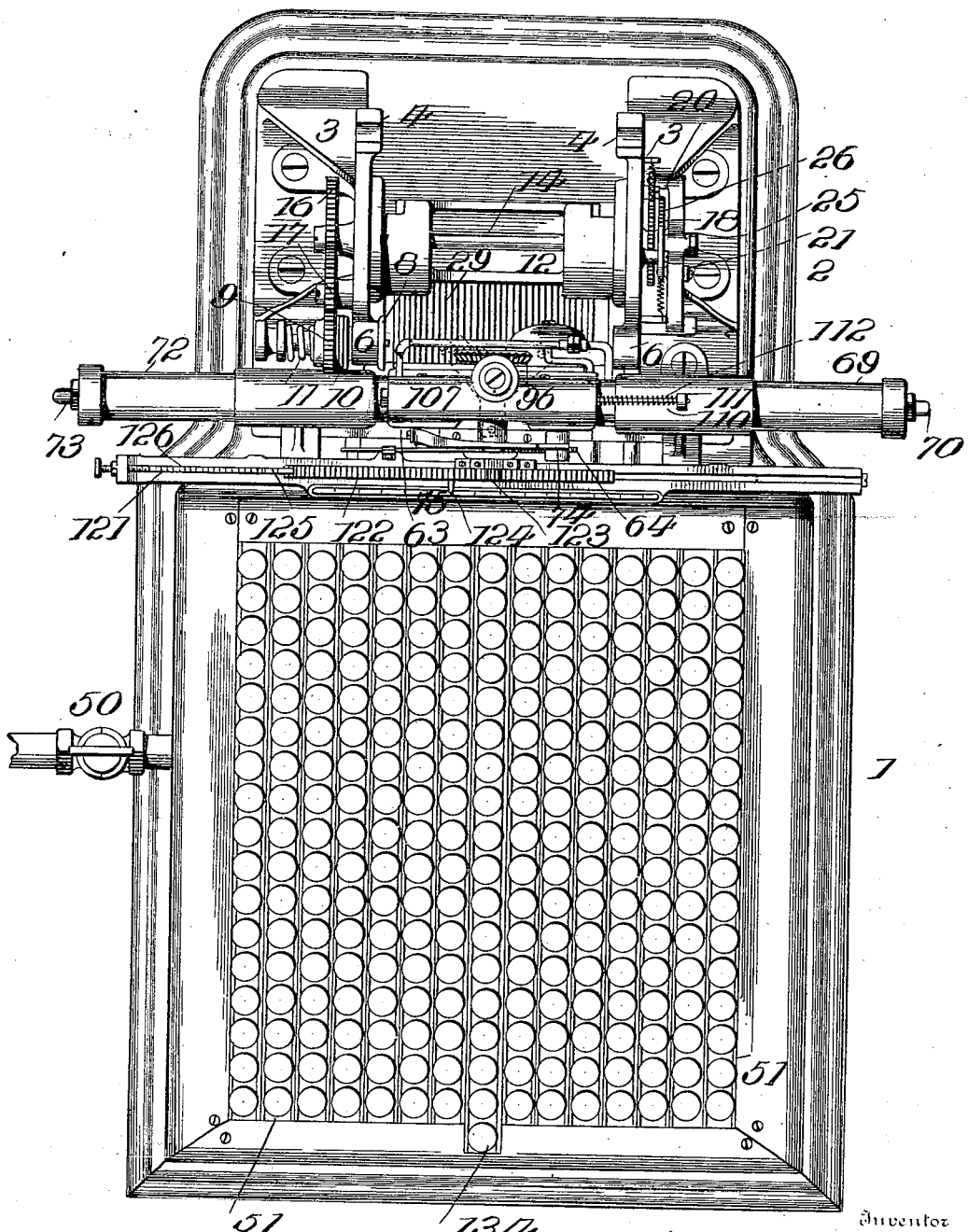
Figure 6:
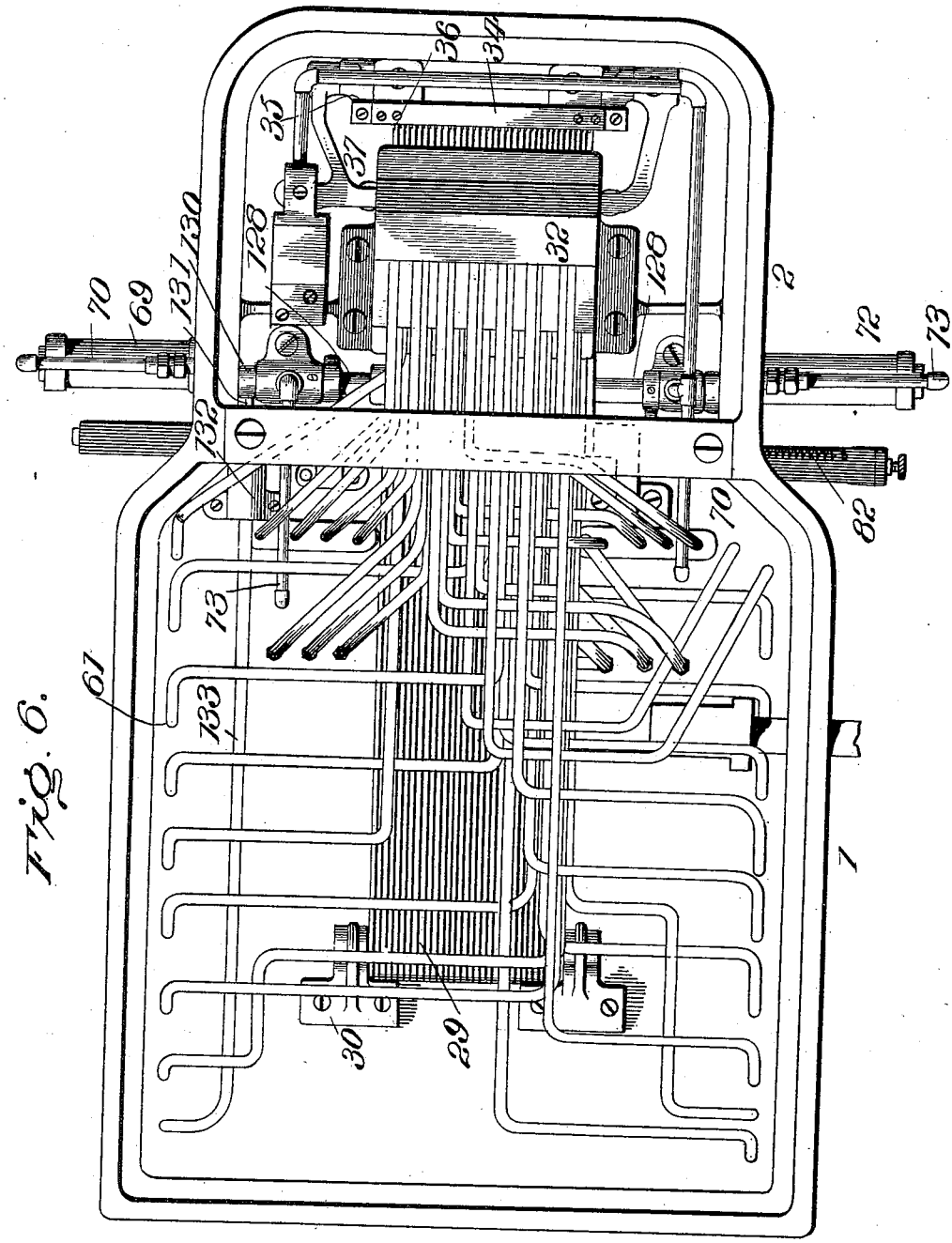
Figure 7:
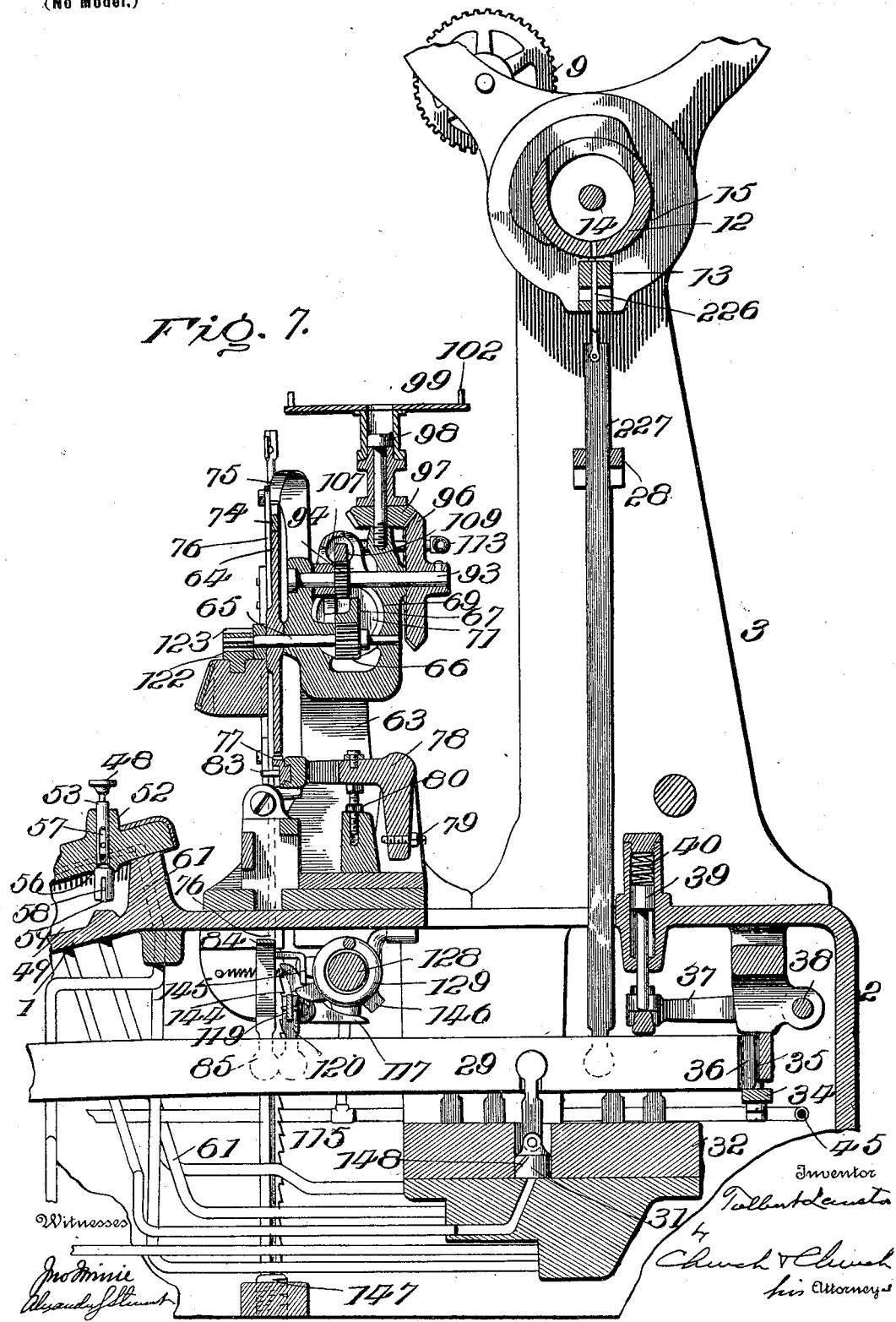
Figure 8:
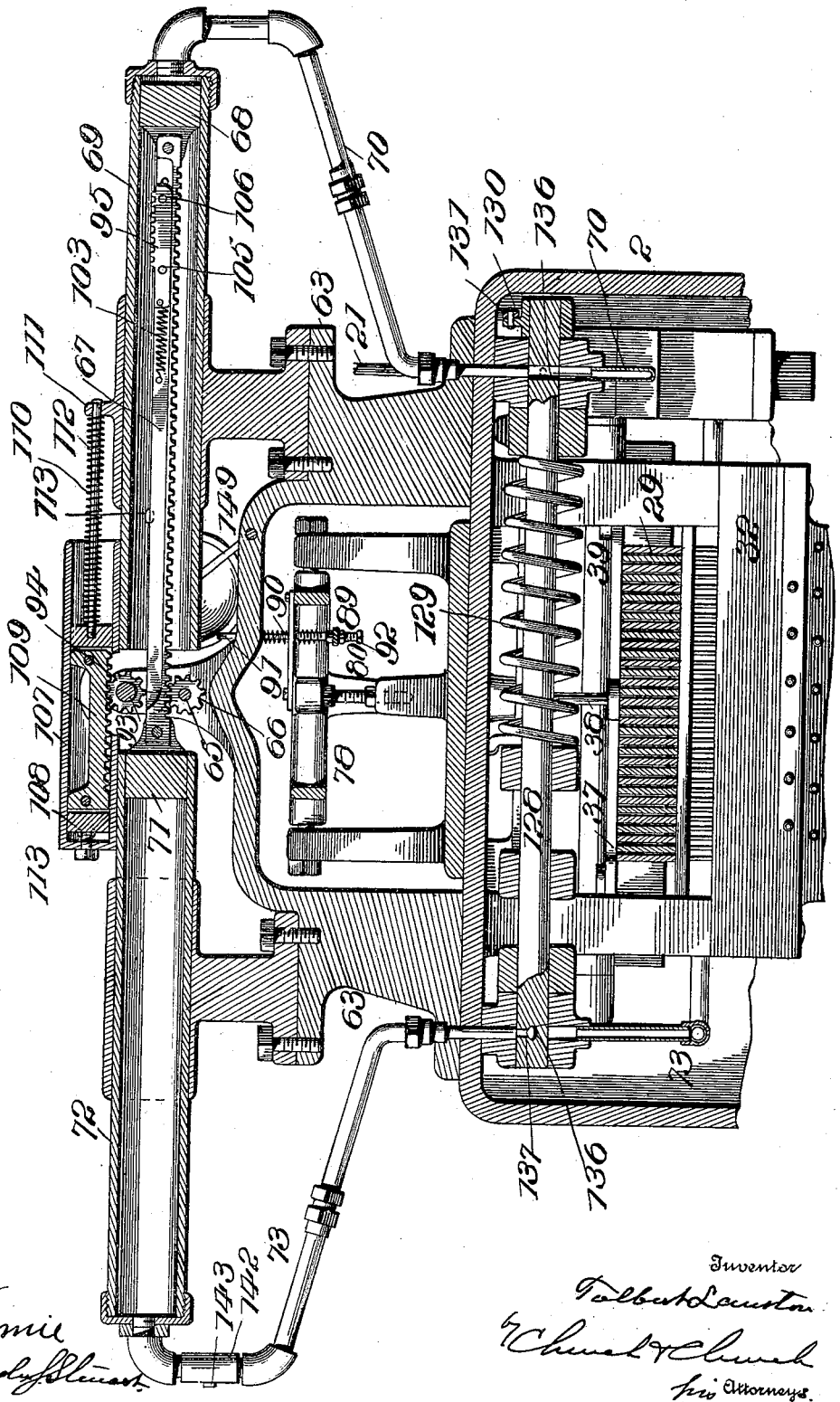

Referring to the accompanying drawings, Figure 1 is a perspective view of a keyboard record-producing mechanism embodying the present improvements. Fig. 2 is a side elevation looking at the right-hand side with a portion of the justification-chart broken away. Fig. 3 is a similar view looking at the opposite side of the machine. Fig. 4 is a top plan view, the record-strip being removed. Fig. 5 is a front elevation, the justification-chart and record-strip being removed. Fig. 6 is a bottom plan showing the system of air pipes or ducts. Fig. 7 is a vertical section through a portion of the machine on a line from front to rear at substantially the center. Fig. 8 is a transverse section in a plane longitudinally of the motor-cylinders for the units wheel and rack. Fig. 9 is a transverse section taken in rear of said cylinders and looking toward the front of the machine. Fig. 10 is a section taken on a substantially-horizontal plane through the top of the keyboard to show the ducts for the horizontal rows of keys. Fig. 11 is a similar view taken on a somewhat-higher plane to show the ducts for the columns of keys. Fig. 12 is a detail vertical section through one side of the keyboard to show one of the air-ducts. Fig. 13 is a plan showing the preferred aggroupment of characters in the keyboard and also, diagrammatically, the punches and some of the connections with the keys. Fig. 14 is a diagrammatic view of the keyboard and punch-operating pistons, showing the connections with the horizontal rows and columns of keys. Fig. 15 is a detail sectional view taken longitudinally of one of the bars which form the keyboard. Fig. 16 is a detail section taken at right angles to Fig. 15. Fig. 17 is a detail elevation of the control-shaft and some of the adjacent mechanism. Figs. 18 and 19 are detail sections taken transversely through opposite ends of the control-shaft to show the ports and passages leading to the motor-cylinders. Fig. 20 is a top plan view of the pawls for operating the justification-indicator. Fig. 21 is a transverse detail section showing the pawl and justification-indicator bar in elevation. Fig. 22 is a top plan view of the rocking frame for controlling the paper-feed. Fig. 23 is a detail section through the paper-feed motor-cylinder and controlling-valve. Figs. 24, 25, and 26 are details of the rack-bar and associated mechanism. Fig. 27 is a detail perspective of the units-rack carrier and rack. Fig. 28 is a vertical section through the units-rack-bar frame, showing one of the stops in elevation. Fig. 29 is a perspective view of the rack-bar-frame-operating lever. Fig. 30 is an elevation of the group of stops or stop-bars. Fig. 31 is a projection of the justification-chart, a few only of the characters being shown. Fig. 32 is a detail of the valve in the duct to the return motor-cylinder for the rack-bar. Fig. 33 is a detail view of the stop for adjusting the length of the line.

Although the machine as a whole is commonly designated a "keyboard," this term is more properly applied to that portion of the machine containing and including the finger-pieces and the parts immediately associated therewith, and it is with this understanding that the term is hereinafter employed.

By reference to Fig. 1 it will be seen that the several mechanisms or groups of mechanisms which go to make up the organized machine are mounted upon a base frame or casing 1, which may be of any approved form and construction. The keys of the keyboard occupy the front inclined portion and may be conveniently arranged in transverse or horizontal rows and perpendicular or vertical columns, as shown.

Back of the keyboard and above the rearwardly-extending portion 2 of the base is located the indicating mechanism, the designating mechanism or punches, and the paper supporting and feeding mechanisms, the said punches and paper supporting and feeding mechanisms being preferably mounted in a supplemental frame 3, which may be bolted or otherwise fastened to the upper surface of the rearward extension 2 of the base; but it will be understood that this base and upwardly-extending frame, including the parts 1, 2, and 3, constitute merely the supporting-frame of the machine and in mechanical construction and appearance may be altered or varied or, in fact, entirely omitted, if other supports are substituted, without in any wise affecting the machine or the invention herein involved.

*Mechanism for holding and feeding the paper.*—The frame 3 is provided at the top with bearings 4, preferably open, for the reception of the shaft of the supply-roll 5, and in addition it is provided with bearings 6 for the shaft of the winding or receiving roll 7, one of said bearings 6 (that on the left-hand side, Figs. 3 and 5) having mounted in it a short shaft, terminating in a disk 8, from which the winding-roll receives its motion, and said shaft is provided on the outer side of said bearing 6 with a gear-wheel 9, mounted loosely thereon and connected therewith through friction-disks 10 and an adjustable spring tension 11 for determining the power required to move the said shaft and gear-wheel 9 independently for a purpose which will presently appear.

The strip of paper or other material in its passage from the supply-roll 5 to the winding-roll 7 passes down around a curved die 12, preferably made hollow and with an opening at the top for the removal of punchings, which latter are forced into it by means of punches working up through a die or guide bar 13, Fig. 7, into the curved die 12, as will presently appear.

Passing centrally through the curved die 12, with its axis coincident with the curvature of the face of said die, is a paper-feed shaft 14. This shaft carries at each end of the die 12 a pin-wheel 15, adapted to enter and coöperate with previously-formed marginal perforations in the paper strip. At its left-hand end the feed-shaft 14 carries a gear-wheel 16, meshing with an idler 17, journaled on the side of the frame 3, said idler also meshing with the gear-wheel 9, the arrangement being such that when rotation is imparted to the feed-shaft 14 the winding-shaft, through the train of gears and disk 8, will also be rotated, and any variation in feed due to the increasing size of the winding-roll will be compensated for by the slip of the gear 9 upon the shaft of the winding-roll, so that the tension of the paper will be maintained and its forward movement restrained and controlled with certainty by the movement of the shaft and pin-wheels before referred to.

Obviously the feeding movement of the paper must take place at a time when the punches are withdrawn therefrom, and for this purpose at the left-hand end of the feed-shaft there is provided an intermittently-operating feeding mechanism, preferably a pawl-and-ratchet driver, operated by mechanism thrown into action for feeding the paper as the punches are retracted.

A ratchet-wheel 18, Fig. 2, is rigidly mounted on the end of the feed-shaft 14, and coöperating with this ratchet-wheel to rotate the same is a pawl 19, mounted on a pawl-carrier and lock-release 20, journaled on the extreme end of the shaft 14. The pawl-carrier is adapted to be reciprocated by a connecting-rod 21, extending down into the base of the machine and connected with a motor-piston, (see Fig. 23,) whose operation will be hereinafter more specifically described in connection with the punching mechanism. When the pawl-carrier is moved forward, it is obvious that the ratchet-wheel and feed-shaft will be advanced a definite distance or a distance proportionate to the range of movement of the pawl-carrier, and this range of movement is determined by an adjustable stop 22 on the frame of the machine. To hold the pawl 19 in position to engage the teeth of the ratchet-wheel 18 and also to aid the forward movement of the pawl-carrier, a spring 23 is attached at one end to the rear portion of the pawl and at the opposite end to the frame.

To prevent retrograde movement of the feed-shaft, a holding-pawl 24 is employed, the latter being pivoted on the frame and held in engagement with the ratchet-wheel 18 by a spring 25, and in order to prevent any overthrow of the feed-shaft and to cause the same to stop when a definite feed has taken place the said shaft 14 is provided with a second reversely-toothed ratchet-wheel 26, Figs. 1 and 5, with which latter a spring-pressed locking-pawl 27, Fig. 2, is adapted to coöperate when thrown into engagement therewith by the pawl-carrier 20, the latter coöperating with the rear end of the said locking or checking pawl 27. The locking or checking pawl 27 it will be understood is normally held out of engagement by its spring, while the pawl-carrier 20 throws it into engagement with the teeth of its ratchet-wheel at the proper instant to check the forward movement of the feed-shaft when the desired extent of feed has taken place, thereby insuring a uniform feed and preventing an overthrow of the paper-feeding mechanism.

*The punching mechanism.*—The punches 226 (thirty-one in number in the present machine) work up through the guide-bar 13 and into the die 12, which latter, as before stated, is made hollow for the reception of the punchings. The guide-bar 13 properly spaces and maintains the position and alinement of the punches themselves, and said punches are connected at their lower ends, preferably by a rivet or pin, with the upper ends of a corresponding series of punch-bars 227, the latter passing down through a guide 28 and having their lower ends pivotally connected with a corresponding series of operating-levers 29. These operating-levers 29, Fig. 7, are pivotally mounted at their forward ends upon a shaft carried in bearings 30, Fig. 6, on the under side of the base-frame 1, and the connection between the said levers and the punch-bars is preferably formed by recessing the said levers at one side and forming the end of the punch-bar to fit such recess, whereby a pivotal connection is formed without the employment of pins and without occupying a materially-greater space than the thickness of the levers themselves.

The punches comprising the series are arranged side by side in line (shown diagrammatically in Fig. 13 and in front elevation in Fig. 5) whose length is somewhat less than the width of the record strip or paper within the marginal perforations, and in their several combinations the punches are designed to produce perforations representing all of the characters and spaces on the finger-pieces of the keyboard, including the justification indications for varying the body width of the justifying type.

The punching and indicating mechanisms are connected to and derive motion from the series of levers 29; but inasmuch as the finger-keys constitute the primary controlling element of the machine it is necessary to supply a competent connecting system intermediate said levers and the finger-keys, whereby the latter may exercise the desired control over the former.

Heretofore elaborate lever mechanisms have been interposed between the finger-keys and punches for controlling the latter; but they are necessarily complicated, cumbersome, and costly, besides which they operate as material limitations upon the speed capacity of the machine. To overcome these and other defects incident to the use of mechanical connections and to simplify the construction of the machine, as well as to lighten the labor of the operator, a pneumatic or fluid-pressure system has been devised and embodied in the present machine. With these ends in view the levers 29 are arranged to be operated by pneumatic or fluid-pressure devices, the application of the latter to or upon the several levers being controlled by the movements of the finger-pieces through suitable valves connected to or preferably formed integral with the finger-pieces. In the simplest form of application of this principle each of the levers 29 has connected with it a motor-piston 31, Figs. 7 and 9, working in a cylinder preferably formed in a cylinder-block 32, supported by the rear portion 2 of the base-frame and extending across beneath the rear ends of the said levers 29. Each cylinder is furnished with a duct or passage 33, through which communication is established, by means of tubes or conduits, with a pressure-supply chamber, as will hereinafter be more particularly described.

Pressure supplied to any cylinder or combination of cylinders beneath the pistons 31 will raise the same, together with the connected levers, and such levers in turn will operate the punch-bars. The range of movement of the levers may be controlled by a horizontal frame 34, adjustably mounted in the rear end of the base, and their position laterally may also be controlled by guides 35, between which the reduced ends 36 of the levers 29 move.

A rocking frame 37, Figs. 7 and 22, journaled on a shaft 38, extends horizontally above the rear ends of the levers 29, and bearing upon the top of this rocking frame is a spring-pressed piston or push-rod 39 for insuring a prompt and uniform return of the levers to their normal positions after being operated, and in order to regulate the power exerted by the rocking frame 37 the spring 40 for depressing the push-rod 39 is preferably extended above the base-frame in position to be readily accessible from the exterior of the machine, as will be understood from an inspection of Fig. 7.

As will be seen from the foregoing, the frame 37 is oscillated each time any one or more of the levers 29 is raised, and advantage is taken of this fact to operate the paper-feed mechanism during the return stroke of the levers or the downward movement of the rocking frame 37. To accomplish this result, there is adjustably connected to one end of the said frame 37 the stem 41 of a valve 42, Fig. 23, which latter controls the admission and exhaust of pressure in the cylinder 43, containing the piston 44, connected with the paper-feed-operating rod 21. Pressure is maintained in the valve-chest through a conduit 45, and this pressure may be admitted either above or below the piston 44 through ports 46 in the valve, and the pressure may be exhausted either from above or below said piston through the ports 47 in said valve. The ports are so arranged that when the valve is elevated by the upward movement of the rocking frame 37 pressure will be admitted above the piston 44 and exhausted from beneath the same, the paper-feed-pawl carrier being thereby drawn down without operating the paper-feed shaft. As the frame 37 returns to its normal or lowered position the conditions are reversed, and pressure is admitted beneath the piston 44 and exhausted from above the same, the paper-feed-pawl carrier being thereby given its operative or upward stroke to feed the paper forward ready for the next designating or perforating operation.

*Keyboard or finger mechanism.*—Inasmuch as the punched strip, the product of the present embodiment of the invention, is the controlling element of a special form of type casting and composing machine and serves by its perforations to position the die-case by movements in transverse planes to center the selected matrix, said die-case containing a series of matrices arranged symmetrically in lines and columns, each column containing characters of the same width setwise and each line characters whose widths increase progressively from one end of the line to the other, it becomes a matter of convenience and advantage to adopt the same arrangement of characters on the keyboard—that is to say, the finger-piece for controlling the punches correspond in their relative arrangement with the columns and lines of the die-case in the character producing or casting machine, and in order to produce proper combinations of punches those punches producing representations of characters in the columns will be operated by the columns of finger-pieces, and those producing representations of characters in the lines will be operated by the lines of finger-pieces. Consequently when any finger-piece is operated the mechanism will be set into action, so as to simultaneously advance a punch for designating the column in which said finger-piece is located and a second punch for designating the particular character in that column, or, in other words, the line in which that finger-piece is located.

For convenience in manipulation the finger-pieces of the keyboard are arranged on an inclined plane at the front of the machine, each horizontal row being successively higher than the next preceding row. The finger-pieces 48 are each in the form of a valve for controlling the admission of pressure to the motor-cylinders of the operating-levers, and as a convenient means for supplying this pressure the front and upper portion of the base-frame 1 is made hollow and constitutes a pressure-supply chamber 49, Fig. 7, to which pressure may be supplied from any suitable source, as a pump or reservoir, through a flexible connection, as shown at 50 in Figs. 3 and 4. For convenience of manufacture the top of the pressure-chamber 49 is preferably formed of a series of bars 51, each having a series of vertical perforations and projections 52, Figs. 7, 15, and 16, in which the valves or stems 53 of the finger-pieces 48 work. Extending longitudinally of each bar 51—that is, from front to rear of the board—is a channel, main, or passage 54, Figs. 11, 12, and 16, one for each column of finger-pieces. There is also formed in each of said bars a series of transverse passages 55, Figs. 10, 12, and 15, which register and form conduits or mains extending from side to side of the keyboard, there being one of such passages for each of the horizontal rows of finger-pieces. The passages 54 55, corresponding to the columns and rows on the keyboard, have openings or ports (shown clearly in Figs. 10, 11, 15, and 16) which communicate with the chambers or vertical openings in which the valves or stems 53 of the finger-pieces work, and said valve or finger-piece stems are so formed that when one of them is depressed it will open the channel of the row and also the channel of the column at whose intersection the said finger-piece is located for the admission of pressure to said channels from the pressure-chamber beneath. In the specific construction preferably employed and illustrated in the accompanying drawings the stem 53 of each finger-piece has its lower end slightly enlarged, so as to form a valve-seating at 56, Fig. 16, when moved upwardly, and immediately above such valve-seat there is formed in the body of the stem an elongated opening and transverse passage 57, which when the finger-piece is depressed will extend down into the pressure-chamber and permit the air or fluid pressure to enter the channels, as above described. The valves will be held up automatically by the pressure in the pressure-chamber, and in order to prevent them from turning in their bearings the lower ends may be slotted, and through the slots thus formed are passed transverse rods or wires 58, held by depending lugs 59, Figs. 12, 15, and 16. A single rod or wire 58 will thus serve to position and retain a whole row of valves or finger-pieces, thereby forming a very simple yet efficient means for accomplishing the desired ends.

The several bars 51 may be conveniently clamped in place and held together, so as to constitute a complete top for the pressure-chamber, by means of through-bolts 60, Fig. 10, and it will be observed from this figure that in order to provide sufficient space for said bolts without conflicting with the passages 55 two of such passages or mains 55 have been arranged between alternate rows of finger-pieces, and the said passages 55 when so located are preferably extended out at opposite sides of the keyboard, so as to afford additional space for the ducts. Communicating with the passages 54 and 55 are a corresponding series of ducts or pipes 61, Figs. 6, 7, and 12, leading to the passages 33 of the lever motor-cylinders 32, Fig. 7. Obviously the particular arrangement of these pipes is not material and they may be arranged to suit the convenience of the manufacturer, or the ducts may be introduced according to any desired system, it only being essential that the ducts should lead from the proper rows and columns in the keyboard to the proper punch-operating cylinders.

In Fig. 14 will be found a diagrammatic view of the arrangement of ducts employed in the present machine, and from this figure it will be seen that for each horizontal row there is provided a duct or main leading to one of the punch-operating cylinders and also a duct or main from each vertical column, leading to one of the said cylinders, and inasmuch as this diagram is of the particular machine herein shown, wherein but one character is adapted to have its body width varied for justification, there is an additional channel for the punch indicating this character—to wit, the space character or type—as will be presently described. The arrangement is such that ordinarily combinations of two punches will be set up for each type designation; but it is obvious that by properly connecting the mains or conduits with other motor-cylinders or providing other mains or branch mains any desired number of punches may be operated or duplicate punching mechanism may be operated for making duplicate record strips or controllers.

As before intimated, the character producing or casting machine for which the representations or character indications are produced in the present machine contemplates the use of a die-carrier having movements back and forth on lines at right angles to each other, such combined movements being adapted to bring any particular character to the centering or casting point; but it is to be noted that in said machine the extreme advance movement of the die-carrier in each of the two transverse planes is determined by a fixed stop. Hence in the record-producing or punching machine of the present application it is unnecessary to provide indications for these two positions of adjustment of the die-carrier. For example, the column of characters along one edge of the die or matrix carrier being all of a given body width and the column designated by the fixed stop, it is only necessary to employ a perforation or representation for selecting the proper row or line in which the character is located. On the other hand, if the character is in the last line designated by a fixed stop it is only necessary to provide a perforation for indicating or designating the particular column in which the desired character is located. Because of this arrangement it is not necessary to provide a punch for indicating the right-hand column of the keyboard nor to provide a punch for indicating the bottom line or row, this column and this row corresponding to the extreme movements of the die-carrier in the casting-machine, as just mentioned. In order, however, to provide the necessary power for operating the several parts and for properly operating the indicating mechanism, there is provided in the present machine levers 29, which correspond to and are operated by the right-hand column and bottom row, but no punches are attached thereto. In the machine illustrated there are fifteen columns and seventeen rows of characters on the keyboard, and in addition there is an anomalous finger-piece—to wit, that for indicating the justifying character or space whose body width is to be varied—said finger-piece being shown in Fig. 13 at the lower left-hand corner of the keyboard. This space-indicating finger-piece will set up a punch corresponding to the column in which it is located, but instead of being connected to a punch corresponding to the row in which it is located it is provided with a separate passage 62, (see Fig. 10,) leading to another punch, as indicated by dotted lines in Fig. 13. It will be seen, therefore, that there is employed in the present machine a total of thirty-one punches for making the two hundred and fifty-five designations contemplated in the present machine. This total of two hundred and fifty-five designations includes the designations for line and column and for setting the justying devices of the casting-machine for producing the proper increment in body width in each of the justifying characters or spaces to give a completely justified line of composition. The punches for producing the designations for setting the justifying mechanism of the casting-machine are controlled, preferably, by the two upper rows of finger-pieces having numerals thereon, as represented in Fig. 13, and according to the particular unit of body width adopted in the present apparatus the top row is calculated on the basis of .0075 of an inch and multiplies thereof and the second row on the basis of .0005 of an inch and multiplies thereof. By combinations of the two indications the casting-machine may be controlled to produce substantially-perfect justification under any condition which can arise in practice. The marking of the finger-pieces of these justification designation-keys with numerals is arbitrary and is done in this machine to correspond with similar markings upon the justification-chart to be hereinafter described, which latter is set automatically by the machine and indicates to the operator exactly which of the justifying finger-pieces are to be operated for producing designations to set the casting-machine for giving a completely justified line.

So far as the present machine is concerned, the mechanism for producing the justifying designations is identical with that for producing the character designations, the positions of the designations on the record-strip giving the desired control in the casting-machine.

*Justifying mechanism and mechanism for operating the same.*—This mechanism is designed to indicate to the operator exactly which justification-keys are to be struck for producing designations representing the amount of body thickness setwise to be added to each of the justifying type-bodies occurring in any given line. It is one of the objects of the invention to provide a mechanism which will without increasing the labor of the operator register accurately the total number of units occupied by the characters previously designated in the record strip or ribbon for any given line and to cause an indicating hand or pointer to register with a suitable chart, dial, card, or the like, bearing upon it combinations of figures or letters corresponding to the justifying-keys, (shown in the present apparatus in the two upper rows of finger-pieces.) The indicated keys when struck will produce the necessary perforations or designations representing the exact increment to be added to each of the justifying type-bodies (space-type in the present apparatus) to produce a perfectly-justified line, thereby eliminating from the problem all necessity for mental calculation on the part of the operator and enabling him by simply following the chart, card, or dial to strike the proper justification-keys at the termination of each line of character designations.

The present embodiment of the invention contemplates the employment of a units-wheel which is advanced or given a movement corresponding with or in definite proportion to the number of units contained in each one of the characters designated in the record-strip, a chart bearing the requisite number of key-indications, (letters or numbers corresponding to similar letters or numbers on the justification-keys themselves,) and a justification-indicator which is advanced, or the chart advanced with relation thereto, each time a designation or perforation for one of the justifying-types (spaces) is made, so as to effect registration with a line of indications on the chart corresponding to the number of such type-bodies contained in the line of type or designations thereof in the record-strip.

Obviously the necessary movements of the indicating mechanism may be secured by moving the chart itself, while the pointer for registering therewith remains stationary, or the pointer may be moved while the chart remains stationary; or, on the other hand, and as applied in the present machine, both may be moved to secure the desired ends— that is to say, the chart is moved in accordance with the body widths of the type previously designated in the line of composition, and the pointer is moved in accordance with the number of justifying (space) type included in said line.

The indicating mechanism is preferably located immediately in rear of the keyboard or finger-pieces and in front of the punches and punch-bars, although obviously it may be placed elsewhere; but this is found to be a convenient location, both because of its proximity to the field of view of the operator and because of the proximity of the controlling parts or operating-levers therefor.

The major portion of the indicating mechanism is mounted in an indicator-frame 63, supported on the base 2 of the machine, and is shown in the several elevations of the whole apparatus and in cross-section in Figs. 7 and 8. A units-wheel 64, having a toothed periphery, is mounted on a shaft 65, journaled in the upper portion of the frame 63, preferably centrally of the machine, and this units-wheel is adapted to be advanced or is given an angular movement proportionate to the value or body width of each type as it is designated on the record-strip.

For the purpose of advancing the units-wheel it is preferably placed under the influence of a motor which acts constantly during the designation of a line, to which end the shaft 65 is provided with a pinion 66, which meshes with a transversely-movable units motor-rack 67. The power for moving the units-wheel is transmitted through the rack 67 and is derived from a motor-piston 68 and cylinder 69, to which pressure is admitted through a duct 70, leading back into the base of the machine to the pressure-chamber 49. The motor-rack is returned to its normal position by a motor-return piston and cylinder 71 72, located, preferably, opposite the motor cylinder and piston 68 69 and receiving its pressure through a duct 73, leading to the pressure-chamber 49. The admission of pressure to one or the other of the cylinders 69 72 is controlled through an intermediate valve mechanism, to be hereinafter more specifically described in connection with the resetting devices, and it is sufficient for the present that the pressure during the time the line of designations is being produced remains on the motor-piston 68 with a constant tendency to rotate the units-wheel forwardly.

The units-wheel is held in check or against rotation by means of a locking pawl or dog 74, pivoted on an upward extension of the frame 63, with its opposite end guided in a similar extension of said frame, so as to insure a correct movement toward and from the units-wheel. The dog 74 is held down in engagement with the toothed periphery of the units-wheel by a spring 75 and is elevated or lifted out of engagement to permit the units-wheel to rotate by means of a push-rod 76, extending down into the base of the machine and connected to the releasing mechanism.

When the units-wheel is released by the upward movement of the dog 74, it is obvious that it must be controlled in its advance in order to register the proper body width of the character designated at the time, and to accomplish this result as the said dog is released or immediately preceding the actual release a units-rack is thrown into mesh with said wheel and allowed to advance until arrested by a stop or stops, which latter serve to determine or measure the advance of the wheel. These stops are arranged in accordance with the units value of the character designated.

The units-rack, numbered 77, (shown clearly in Figs. 7, 27, and 28,) is adapted to move tangentially to the periphery of the units-wheel in bearings formed in the front edge of a units-rack carrier or rocking frame 78, journaled in the frame 63. The frame 78 is limited in its movements for bringing the rack into and out of mesh with the units-wheel by means of adjustable stops 79 and 80. The units-rack carrier 78 is provided with a pin or projection 81, Fig. 27, working in a slot in the push-rod 76, the play allowed said pin as the units-rack carrier is elevated being sufficient to permit the said rack to come into initial mesh with the units-wheel before the push-rod is operated by the projection to release the locking-dog 74. Thus the units-rack is always engaged prior to the release of the locking-dog and the locking-dog is allowed to come into engagement prior to the disengagement of the units-rack, the result being that the units-wheel is under the control of the units-rack at all times when not locked in position by the dog.

When released, the units-wheel will tend to advance the units-rack until arrested by one or the other of a series of stops, as will be presently explained, and when released from the influence of the units-wheel said rack is returned to its normal position by means of a spring 82, Fig. 1, attached at one end to the units-rack and at the opposite end to the frame of the machine.

The units-rack itself is preferably provided with a projection 83, adapted to coöperate with one or the other of a series of stops 84, working vertically in the frame 63 and adapted to be projected into the path of the units-rack by previously-selected operating-levers 29. These stops 84, which serve to measure the advance movements of the units-wheel, are preferably in the form of vertical bars arranged side by side with their upper ends each of a thickness corresponding to the unit of the type-bodies, while their lower ends are provided with circular bearings 85, adapted to fit into recesses formed in the sides of the operating-levers 29, (see Fig. 7,) whereby when a lever having a stop-bar connected therewith is operated its stop-bar will be projected above the other stop-bars and into the path of the projection on the units-rack in position to arrest the movement of the latter and with it the units-wheel when the locking-dog is withdrawn from the latter.

According to the system to which the present machine has been specially adapted the type are divided into fifteen sizes, the smallest being six units in width, with a uniform increment of one unit throughout the series, progressively. Hence the first column to the left on the keyboard represents six-unit type, the next column seven-unit, and so on, increasing by one unit until the last or right-hand column represents twenty-unit type.

The space-type to which the justification increase is applied has a normal value of less than that of the smallest type—in the present instance four units. To measure these units, the stops 84, corresponding with the several columns of characters, are so formed or proportioned that each will represent or have a value of one unit, while the first stop of the series corresponding with the space-type is so formed or located with respect to the normal or starting point of the units-rack that it will intercept or arrest the latter when it shall have traveled, say, four units, said justifying space-type being provided with a lateral projection or offset 86, Fig. 30, increasing its thickness to two units. The number of stops 84 therefore corresponds with the number of vertical columns in the keyboard—to wit., fifteen—with one additional stop for registering the number of units in the justifying character (space) type, and these stops 84 are connected, respectively, with the operating-levers corresponding to the vertical columns in the keyboard. The number of units in body width in the several columns is arbitrary, and if several columns have the same body width the connection may be made for operating the same stop, or if the units in the several columns vary otherwise than uniformly the stops may be correspondingly positioned or made thicker or thinner to secure the desired registration.

By reference to Figs. 9 and 14 the arrangement will be comprehended at once, and from these figures it will be seen that commencing with the left-hand operating-lever in Fig. 9 (omitting the second lever, which is the lever corresponding to the top row as shown in Fig. 14) the stops are connected with each lever in succession up to the sixteenth lever, while the space-character stop is connected with the twenty-third lever, counting from the left-hand side in Fig. 9 and from the right-hand side in Fig. 14. The intermediate portion of this last-mentioned stop-bar is deflected laterally, whereby its upper end is brought into proximity to the other stop, so that the whole number of stops may be grouped and held between one set of guides.

Obviously each time one of the stop-bars and stops is raised and a punch or combination of punches operated to make a designation the rocking frame, together with the units-rack, should also be raised, and in order to insure proper corelative movement between the stops and the units-rack it is preferred to operate the rocking frame through the medium of the stop-bars and stops themselves, for which purpose the bars 84 are provided on their rear edges with projections 87, which when the stops have moved upwardly a sufficient distance to lie in the path of the projection 83 on the units-rack 77 will rock the frame 78, throw the units-rack 77 into mesh with the units-wheel, and release the wheel from the action of the locking-dog, whereupon the units-rack, under the influence of the units-wheel, will advance until its forward movement is arrested by the stops 84, which started it into action.
In order to properly time the movements of the units-wheel and parts controlled thereby, so as to prevent retardation of the other portions of the mechanism, thereby effecting an increase in the speed capacity of the machine, it is desirable that the units-wheel should be released as soon as practicable after the movement of the stops and operating-levers has been inaugurated, thus allowing the units-wheel and connected parts to advance simultaneously with the final portion of the advance movement of the operating levers and punches. To accomplish this, sufficient play is allowed between the stop-bars and frame to permit the bars to rise into the path of the projection 83 before the frame 78 begins to move, and a spring or elastic connection is interposed between the frame 78 and its operating mechanism, so that the latter may make its full stroke. A convenient means for accomplishing these results is shown in Figs. 27, 28, and 29, wherein a blade or wing 88 is shown pivotally mounted on the under side of the rocking frame 78 and projecting over and lying in proximity to the projections 87 on the stops 84. A rearward extension 89 of this blade or wing 88 is connected through a light spring 90 with an adjustable hanger or support 91, mounted on the frame 78. The upward movement of the arm 89, and consequently the downward movement of the blade 88, is limited by a set-screw 92, and in operation the initial movement of any one or more of the stops 84 brings it up into the path of the projection 83. The projection 87 on the stop then engages the wing or blade 88 and lifts the frame 78, the tension of spring 90 being sufficient for this purpose, thereby throwing the rack 77 into mesh with the units-wheel, as before explained. The frame 78 being now arrested in its upward movement by the stop 79 a further movement of the stop is permitted by the yielding of the spring 90. Obviously other forms of spring connection between these parts mights be substituted; but that shown gives a wide range of movement with a very uniform tension and in practice has been found to be highly efficient.

The justification-indicator proper, or that part from which the readings are taken, is controlled in its advance movements by or to correspond with those of the units-wheel; but inasmuch as it is not required in the present form of apparatus that readings should be taken or attention be given to the justification-indications until the end of the line is approached the indicator is arranged to remain stationary or inactive during the first portion of the advance of the units-wheel and is engaged and advanced only during a predetermined small portion of the final movement of the units-wheel as it approaches the end of the line, although it might, if for any reason or purpose desired, be connected for operation during the entire or any definite 130 part of the movement of the units-wheel.

The connections for operating and controlling the movements of the indicator are shown in Figs. 7, 8, and 26, wherein in the frame 63, above the units-wheel shaft 65, is journaled a shaft 93, having upon it a pinion 94, adapted to mesh with a secondary rack 95, carried by the units motor-rack 67. In addition to the pinion 94 the said shaft at its rear end carries a bevel-pinion 96, meshing with a smaller pinion 97 on the vertical shaft 98, and upon the upper end of this latter shaft is mounted a spider or carrier 99 for the chart or justification-cylinder.

The justification-chart is preferably in the form of a cylinder 100, a projection of which is shown in Fig. 31. It is divided vertically and horizontally into sections representing lines and columns, each section bearing letters, figures, or other indicia corresponding with the markings on the two upper or justification rows of finger-pieces of the keyboard. Each line corresponds with a given number of justification characters, such as space-type, occurring in a line of composition, while the letters, figures, &c., in the lines—in other words, the columns—represent the justification-keys whose value added to the normal value of the justification space-type will correspond to the width to be accorded each justification character or space-type in order to fill out the line.

For example, the first line (counting from the bottom) may represent or correspond to one justification character or space-type occurring in a line. The second line will correspond to two justification-spaces, and so on to any desired extent.

The number of justification-spaces occurring in a line of composition does not alone indicate the value in width of said spaces, this factor being a product of the total space to be filled by justification divided by the number of justification-spaces occurring in the line. Consequently each line of the chart is provided with a series of characters representing different combinations of justification-keys whose aggregate value equals the amount of space remaining to be filled by justification divided by the number of spaces represented by the line in which said characters occur.

It will be observed that the justification value is not represented in terms upon the chart, but merely the justification-keys or two uppermost rows of finger-pieces on the keyboard. Hence it is only required of the operator that he should strike the particular justification key or keys indicated by the chart.

The flat chart after being formed into a cylinder 100 is mounted upon a ring 101, which may be placed in position upon the spider or frame 99 and held thereon by the pins 102, this form of attachment being adopted in order to permit of the ready substitution of different charts or cylinders for use in connection with different fonts of type, as in such case different justification values would have to be accorded the space-type or justification characters.

As before stated, the justification chart or cylinder is operated by the motor-rack 67 through the medium of the supplemental rack 95, and in order that the latter may act upon the justification chart or cylinder without undue shock the said supplemental rack 95 is mounted upon the motor-rack 67, so as to be permitted a limited longitudinal movement thereon, and is held normally retracted by a spring 103. Thus when the motor 67 advances suddenly upon the release of the units-wheel its motion will be imparted to the chart through the medium of the spring 103, and said spring will, while allowing for elasticity in the movement, bring said chart quickly to its correct position.

It will be understood that the justification-chart, together with the train of gears 97, 96, and 94, remains inactive until the supplemental rack 95 is brought into mesh with the gear 94, and in order to insure an accurate registration or engagement of the supplemental rack and gear-wheel the shaft 93 is provided with an arm 104, adapted to contact with or be engaged by a pin 105 on the supplemental rack for initiating the movement of the justification-cylinder and connected parts. The pin 105 and the arm 104 may be set so as to effect a proper coöperation of the teeth on the gear-wheel and rack, respectively, and thus insure accurate results even though the adjustment be somewhat loose and the form and size of the teeth and gear-wheel be somewhat inaccurate.

As a convenient means for mounting the supplemental rack 95, the motor-rack 67 is recessed, as shown clearly in Figs. 25 and 26, for the reception of the supplemental rack 95, the attachment between the two being formed by a pin-and-slot connection 106.

The movement of the justification-chart by the motor-rack imposes upon said rack a greater amount of work than it would otherwise have to perform, and to prevent retardation due to this cause and insure a prompt and ready action of the justification-chart a supplemental motor for the chart is preferably employed and arranged to be thrown into action immediately after the supplemental rack meshes with the pinion 94. This supplemental motor is shown in section in Fig. 8 and in rear elevation in Fig. 9, from which it will be seen that immediately above the cylinders 69 and 72 there is arranged another cylinder 107, containing a piston 108, carrying a rack 109, the latter meshing with pinion 94. Pressure admitted to the cylinder 107 will drive the piston and rack in a direction the reverse of that in which the motor-rack 67 is moving. The return movement of the piston and rack 108 109 is secured by means of a relatively-light coiled spring 110, interposed between the front end of the piston and a stop 111 upon the frame, said spring preferably surrounding a rod 112, connected with the piston and working through the stop 111.

To throw the supplemental motor into action at the proper moment, the end of the cylinder 107 is connected by a pipe or duct 113, Fig. 9, with the cylinder 69, as indicated in Fig. 8, the point of communication with the cylinder being such that in the travel of the motor-rack 67 its piston 68 will pass beyond the opening of the duct 113 just as the pinion 94 meshes with the supplemental rack, and consequently pressure is at such time admitted to the cylinder 107, and the piston 108 then acts in conjunction with the motor-rack and piston 68 to rotate the justification-chart forwardly, practically relieving the motor-rack and piston of the additional labor required to turn the chart.

For registering with the justification chart or cylinder there is provided a pointer 114, preferably in the form of a horizontal rod having an opening in its end, through which the justification-key characters on the chart may be read, and this pointer 114 is mounted upon the upper end of a vertical carrier or rod 115, extending down into the base of the machine and adapted to be elevated a distance corresponding to the distance between the adjacent rows on the justification-cylinder each time one of the justifying characters or space-type is designated in the record strip or ribbon. The carrier 115 slides in a bearing 116, Fig. 9, and its lower portion is provided with ratchet-teeth, as shown in Figs. 7 and 21. Coöperating with the teeth on this carrier 115 are a pair of pawls 117 and 118, both spring-pressed, the one mounted in fixed bearings on the frame, while the other is mounted upon the end of a lever 119, journaled at the farther end on the frame and connected at an intermediate point by means of a rod or connector 120, Fig. 7, with the lever 29. This lever 29 is operated by the space-character finger-piece—to wit, the twenty-third lever, counting from the left-hand side in Fig. 9—so that each time the said lever 29 is operated it will in turn move the lever 119, and the latter, acting through its pawl 117, will raise the rack 115 a proper distance, where it will be caught and held by the pawl 118. Each time, therefore, one of the justifying characters or spaces is indicated in the record-strip the pointer 114 will be advanced one step, so as to register with a new line on the justification-chart, and when any of the other characters on the keyboard are indicated in the record-strip the units-wheel will advance in accordance with the body width thereof, and at the proper time the justification-chart will begin to move in unison with said units-wheel. The indications on the chart registering with the pointer shows the operator exactly which justification-indicating keys are to be struck for producing designations in the record-strip which will set the casting-machine and give the required justification by varying the body width of the justification characters or space-type.

*Line-indicator.*—Extending across the machine in front of the units-wheel is a guide or track 121, supported by the frame 63 and having upon its front side a line-scale or graduation-marks for indicating the space remaining unfilled in a line or the length of the line, as will be readily understood. Sliding in this track is a line rack-bar 122, whose position is such that it will mesh with a pinion 123 on the front end of the units-wheel shaft 65. Thus the said line rack-bar will be moved in exact accordance with the units-wheel in both directions. Upon the front of the rack-bar there is mounted an indicating finger or pointer 124, which registers with the scale on the front of the frame 121.

It is obvious that the length of the line may be regulated by limiting the retrograde movement of the rack-bar 122, and as a convenient means for accomplishing this end a stop 125 is adjustably mounted in the track or way 121—as, for example, by providing a rackbar 126 in the bottom of said track or way, with which a tooth or teeth 127 on the stop 125 will engage to prevent the movement of the stop when struck by the line-rack. For adjustment the stop 125 may be raised out of engagement with the rack 126, the line-rack and indicator brought to the desired position, and the stop allowed to reëngage, when it will limit the retrograde or reverse movement of the line-rack, so as to adjust the line to the desired number of units. The operator by consulting the line-indicator may see how much of the line would be occupied by the characters previously designated, even before the justification-chart begins its movement, and in order to bring to his attention the fact that the line is nearly full it is preferable in addition to the visual indicator to provide an audible indicator, such as a bell or gong 149, Fig. 9, adapted to be struck by a spring-pressed hammer or clapper 150, the latter being operated by a pin 151, preferably located on the rear face of the beveled gear-wheel 96, so as to ring the bell when the said beveled gear and the justification-cylinder commence to move, thereby warning the operator that the justification area has been reached.

*Resetting mechanism.*—The parts in the present apparatus which require resetting or restoration to normal position at the conclusion of the formation of a line of designations corresponding to a line of composition are the motor-rack and parts connected with and controlled thereby, including the units-wheel, the line-indicator, and the justification-chart and also the pointer which registers with the justification-chart.

As before explained, the motor-rack for imparting motion to the units-wheel and other parts of the registering mechanism is operated in one direction by the piston 68, working in the cylinder 69, and in the opposite direction by the piston 71, working in the cylinder 72. These two cylinders communicate through pipes or ducts 70 73 with the pressure-supply chamber, and at a proper point in their length there is interposed a valve mechanism which may be shifted to exhaust the pressure from one or the other of the cylinders and admit pressure to the opposite cylinder, and with this valve mechanism a trip is connected for releasing the pawls for actuating the pointer or indicator which coöperates with the justification chart or cylinder. By reference to Figs. 7 and 8 it will be seen that a cross-shaft 128 is journaled in the frame, preferably beneath the indicating mechanism, which shaft has connected with it one end of a spring 129 for holding it normally in one position of adjustment. At one end the shaft has mounted upon it a crankarm 130, Figs. 8 and 9, to which the end of a connecting-rod 131 is attached. At its opposite end this connecting-rod is attached to a piston working in a cylinder 132, Figs. 6 and 9, to which pressure may be admitted through a pipe 133, extending back, as indicated in Fig. 6, into position to be connected with and controlled through a return finger-piece 134, Figs. 1, 10, 11, and 14, similar in mechanical construction to the other finger-pieces on the keyboard. Admission of pressure by the manipulation of this finger-piece 134 will oscillate the rock-shaft 128 against the tension of the spring 129.

The shaft 128, Figs. 17, 18, and 19, is provided with or made in the form of valves at points near its opposite extremities for controlling the admission and exhaust of pressure in the oppositely-arranged motor-rack cylinders, for which purpose the ends of the shaft are provided with transverse openings 135 and 136, adapted to be brought into line with and form portions of the passages or pipes 70 73. Normally the port 136 is in registry with the duct 70 to admit pressure to the cylinder 69, and when oscillated by the manipulation of the finger-piece 134, as before described, the port 136 will be turned out of registry with the duct 70 and the port 135 will be turned into registry with the duct 73, thereby admitting pressure to the return motor-cylinder 72. To open the exhaust for the opposite end of the cylinder from that to which pressure is admitted, the shaft 128 is provided with branch ports 137 and 138, arranged at such an angle that when the shaft is in one position of adjustment said ports will open communication between the cylinders and the external air through ports 139 and 140. (Shown clearly in Figs. 18 and 19.)

From the foregoing it will be seen that whenever the finger-piece 134 is manipulated the shaft 128 will be oscillated, pressure admitted to the return-cylinder 72 and exhausted from the motor-cylinder 69, and upon the release of said finger-piece the shaft will return to its normal position, (shown clearly in Figs. 18 and 19,) again admitting pressure to the motor-cylinder 69 and opening the cylinder 72, so as to permit a free exhaust therefrom. Now in order to permit such exhaust from the cylinder 72 to take place with the utmost freedom and at the same time to in a measure throttle the admission of pressure to this return-cylinder, and thus prevent the motor-rack and attached parts from acquiring too great momentum, there is located in the duct 73 a throttling-valve 141. (Shown in section in Fig. 32.) This valve is mounted in a casing 142, Figs. 8 and 9, and is permitted a limited longitudinal movement therein, the reverse movement being limited by a set-screw 143. Through the valve 141 a relatively-small aperture is formed, and when said valve is unseated by a downward movement the air is free to pass around the same through the side openings. (Also shown in Fig. 32.) Thus when pressure is admitted to the duct 73 the valve 141 will be seated and the fluid will at that point be throttled, so as to enter the cylinder 72 more slowly; but when pressure is released or reduced in the pipe 73, as by opening said pipe to exhaust, the valve 141 will drop, opening the exhaust and permitting the fluid to escape freely from the cylinder 72.

The units-wheel locked by the dog 74 is released simultaneously with the rocking of the shaft 128 by means of a projection 144 on the shaft 128. (See Fig. 7.) Said projection when said shaft is oscillated to reset the mechanism engages a projection 145 on the lower end of the push-rod 76, thereby elevating said rod 76 and dog 74, releasing the units-wheel, and abandoning it to the control of the motor-rack. This movement of the push-rod 76 does not move the oscillating frame 78, because the slot in the push-rod 76 is long enough to permit it to have the necessary range of movement without engaging the pin on said frame. In addition to releasing the units-wheel, shaft 128 is also utilized to release the holding-pawls for the carrier 115, which supports the pointer, for which purpose the said shaft 128 is provided with a second projection 146, Fig. 21. As the shaft is oscillated to reset the mechanism the projection 146 depresses the rear ends of both of the pawls 117 and 118, thereby throwing them out of engagement with the ratchet-teeth of the carrier 115, permitting said carrier, together with its pointer, to drop by gravity to its initial position. To insure a prompt movement of the carrier and pointer, the carrier may be provided with a weight 147 at the lower end, as shown in Fig. 21, or a spring may be provided for the purpose.

Leakage around the pistons for the operating-levers 29 will serve to permit said pistons and levers to return to normal position when pressure from the pressure-supply chamber is cut off; but in order to insure a prompt return of such parts each of said pistons is preferably provided with a vent passage or exhaust in the form of a spiral groove in its periphery, as shown at 148 in Figs. 7 and 9.

*Operation of the machine.*—In practice each machine is furnished with a number of charts or cylinders calculated on the basis of the several different styles or fonts of type the casting-machine is organized to produce—such, for example, as agate, nonpareil, minion, &c.—and before starting to produce a record-strip the operator applies the appropriate chart for the type to be produced, inserts a previously-prepared roll of paper or other suitable material, and sets the stop to indicate the length of line. The machine thus equipped and adjusted is ready for use, and the operator proceeds to manipulate the finger-keys, pressing in succession the keys corresponding to characters, points, spaces, &c., as they occur in composition and continues so to do until, his attention being called to the fact that he is nearing the end of a line, he observes that no more characters can safely be introduced, whereupon he takes note of the characters disclosed on the justification-indicator and closes the line by pressing the indicated keys of the justification-rows, thereby producing in the record-strip the appropriate designations or perforations for setting the justifier of the casting-machine. Pressure upon the return-key 134 at once restores the parts of the machine to their initial positions, and the operations are repeated for the next and each succeeding line of matter. In thus manipulating the keys the operator is not called upon to expend power sufficient to actuate the punches and indicating mechanisms, but merely enough to shift the controlling-valves which govern and direct the application of the power system. By this means not only are the labors of the operator lightened, but the available speed of production is greatly increased and certainty of action secured.

Having now particularly described and ascertained the nature of my said invention and in what manner the same is to be performed, I declare that what I claim is—

1. The combination with a series of character-designating punches and a corresponding series of motors for operating said punches, of a series of finger-pieces arranged in horizontal rows and vertical columns, each finger-piece being located at the intersection of a row and a column, connections controlled by the finger-pieces in each row for operating a punch-motor, and connections controlled by the finger-pieces in each column for operating a punch-motor, whereby, upon operating any one finger-piece, a motor corresponding to the column in which that finger-piece is located is operated, and a motor corresponding to the row in which that finger-piece is located is also operated, to produce an indication corresponding to that finger-piece alone; substantially as described.

2. The combination with a series of character-designating punches and a corresponding series of motors for operating said punches, of a series of fluid-pressure mains arranged in horizontal rows and in vertical columns, each row and each column controlling an independent punch-motor, of a series of finger-pieces located at the intersection of said rows and columns for controlling the application of the energizing power through said mains to the motors, whereby upon the operation of any finger-piece, a motor and punch corresponding to the row, and a separate motor and punch corresponding to the column in which said finger-piece is located will be operated; substantially as described.

3. The combination with a series of punches for designating characters, pressure-operated pistons and cylinders constituting motors for operating said punches, and a pressure-supply, of two series of mains or ducts, each of the ducts controlling a separate punch-motor, and finger-pieces, each controlling the admission of pressure to one of the ducts of each of the series, whereby, upon the operation of any finger-piece, two punches will be operated; substantially as described.

4. The combination with a series of character-designating punches, a series of motors corresponding thereto and comprising cylinders and pistons for operating said punches and a pressure-supply, of a keyboard having two systems of ducts, each duct communicating with a cylinder, and valved finger-pieces, each controlling the admission of pressure to one of the ducts of each system, whereby upon the operation of any one finger-piece, two punches will be operated; substantially as described.

5. The combination with a series of character-designating punches, a series of motors, one for each punch and comprising a piston and cylinder and a pressure-supply chamber, of a series of ducts arranged in columns and a second series of ducts arranged in rows transverse of the columns, each duct communicating with a cylinder, of a series of finger-pieces located at the intersection of the rows and columns of ducts and each provided with a valve for opening communication between the pressure-supply chamber and one of the ducts in each of the systems, whereby two punches are operated; substantially as described.

6. In a character-designating machine, the combination with a series of character-designating punches and a series of pressure-operated motors, one for each punch, of a pressure-supply chamber, two series of ducts arranged in proximity to each other above said chamber, each duct of each system communicating with a punch-motor, and a series of valved finger-pieces extending down into the pressure-chamber and controlling the admission of pressure from said chamber to the ducts; substantially as described.

7. In a character-designating apparatus, the combination with the character-designating punches, and the pressure-operated motors, one for each of said punches, of the keyboard formed by a series of bars secured side by side and having rearwardly-extending channels or ducts formed therein and independent transverse channels or ducts also formed therein, each of said channels or ducts communicating with a punch-motor and a series of valved finger-pieces mounted in said bars for controlling the admission of pressure to said ducts; substantially as described.

8. In a character-designating apparatus, the combination with a designating mechanism comprising punches and pressure-operated motors for said punches, of a keyboard for controlling the admission of pressure to said motors formed by a series of bars secured side by side with channels or ducts formed in the meeting faces of said bars and transverse registering apertures in said bars constituting ducts or channels, each of said ducts or channels communicating with a motor, and vertically-movable finger-pieces mounted in said bars for controlling the admission of pressure to said channels; substantially as described.

9. In a character-designating apparatus, the combination with the designating mechanism and motors for operating the same, of a keyboard embodying a pressure-supply chamber, a series of channels for communicating pressure to the motors of the designating mechanism, valved finger-pieces working vertically into said pressure-chamber for opening communication between the pressure-chamber and passages, and transverse rods for holding said valved finger-pieces in alinement; substantially as described.

10. In a character-designating apparatus, the combination with the designating mechanism and motors for operating the same, of a keyboard embodying a pressure-supply chamber, a series of channels for communicating pressure to the motors, of the designating mechanism, valved finger-pieces having their lower ends slotted and transverse rods located in said slots for holding the finger-pieces in alinement; substantially as described.

11. The combination with the punches for designating characters, the pivoted levers with which said punches are connected and the motor-cylinders and pistons connected with said levers, of the pressure-chamber, the ducts or passages communicating with the motor-cylinders and the finger-pieces for opening communication between the pressure-chamber and the motor-cylinders; substantially as described.

12. In a designating apparatus, the combination with the punches, the pivoted operating-levers with which said punches are connected, the cylinder-block having the cylinders formed therein and the pistons working in said cylinders and connected with the punch-operating levers for operating the same, of the pressure-supply ducts communicating with said cylinders, a pressure-supply, and finger-pieces for controlling the admission of pressure to said ducts and cylinders; substantially as described.

13. In a designating apparatus, the combination with the character-designating mechanism, and the motors therefor, comprising cylinders and pistons, with exhaust-vents for permitting the escape of pressure from the cylinders, of a pressure-supply, ducts for supplying pressure to said cylinders and valved finger-pieces for controlling the admission of pressure to said ducts and cylinders; substantially as described.

14. In a designating apparatus, the combination with designating mechanism, of motors for operating said designating mechanism, comprising vented cylinders and pistons working therein, of a pressure-supply, ducts for supplying pressure to said cylinders and finger-pieces controlling the admission of pressure to said ducts and cylinders; substantially as described.

15. In a designating apparatus, the combination with designating mechanism, and motors for operating said designating mechanism, comprising constantly-vented cylinders and pistons working therein, of a pressure-supply, ducts for supplying pressure to said cylinders and a series of finger-pieces for admitting pressure to each of said ducts, whereby the finger-pieces control only the admission of pressure to said motor-cylinders and not the exhaust therefrom; substantially as described.

16. The combination with a paper-feed, a paper-feed-motor-designating mechanism having motors for operating the same, and finger-pieces controlling said motors, of a controlling mechanism for the paper-feed motor operated by the motors for the designating mechanism; substantially as described.

17. The combination with the paper-feed mechanism and motor for operating the same, of designating-punches, the motors for operating said punches, the finger-pieces controlling said motors and the paper-feed-motor-controlling mechanism operated by the punch-motors; substantially as described.

18. In a character-designating mechanism the combination with the paper-feed mechanism, a motor-piston and cylinder therefor, and a valve controlling the admission of pressure to said motor-cylinder, of a series of designating-punches, a corresponding series of motors for operating said punches, finger-pieces for controlling the admission of pressure to said motors and a paper-feed-motor-valve-operating mechanism controlled by the punch-operating motors; substantially as described.

19. In a character-designating machine, the combination with a paper-feed mechanism, and a series of punches for making the character designations, of operating-levers for said punches and motors for said operating-levers, finger-pieces controlling said motors and a paper-feed motor controlled by the punch-operating levers; substantially as described.

20. The combination in a designating apparatus, with a paper-feed mechanism, a series of punches, a series of punch-operating levers, a series of motors for operating said levers, and finger-pieces controlling said motors, of a paper-feed motor, and a controlling mechanism for said paper-feed motor embodying a rocking frame having a bar extending across the punch-operating levers adapted to be operated by movement of any one or more of said levers; substantially as described.

21. In a character-designating apparatus, the combination with the character-designating punches, the operating-levers therefor, motors for operating said levers and the finger-pieces controlling said motors, of the rocking frame overlying said levers and the spring-pressed pin coöperating with said frame for returning the levers to normal position; substantially as described.

22. In a paper-feeding mechanism, the combination with a feed-shaft and a winding-roll driven therefrom with gears interposed between said shaft and winding-roll and embodying a friction connection for permitting said roll and shaft to have differential movements in accordance with the quantity of paper on the winding-roll, of a driving mechanism for said feed-shaft having a ratchet-wheel, a reciprocating pawl-carrier for moving said wheel intermittently, a motor for reciprocating said pawl-carrier and a locking-pawl for limiting the forward movement of the ratchet-wheel having an extension for coöperation with the pawl-carrier to throw said locking-pawl into operative position; substantially as described.

23. In a paper-feed the combination with the paper-feeding shaft, the winding-roll, gear-wheels interposed between said feed-shaft and winding-roll, friction-disks for connecting the gear-train with the winding-roll and the adjustable spring tension for regulating the friction of the disks, of a driving mechanism for the feed-shaft comprising a reciprocating pawl-carrier and a pawl and ratchet-wheel on the feed-shaft; substantially as described.

24. In a designating apparatus, the combination with the character-designating mechanism, and finger-pieces controlling the same, and an indicating mechanism for indicating the body widths of the characters designated, embodying a driven part adapted to advance in accordance with the body widths of the characters designated and to move reversely in resetting, of motors for moving the said driven part in opposite directions, one of said motors acting during the resetting period and a finger-piece for controlling said motors; substantially as described.

25. In a measuring mechanism for a designating-machine such as described, the combination with a units-wheel with means for controlling its advance movement in accordance with the body widths of the characters designated, of a motor for advancing said wheel, a motor for resetting the parts and a finger-piece controlling the application of power to said motors respectively; substantially as described.

26. In a character-measuring mechanism for a character-designating machine, such as described, the combination with a units-wheel, with means for limiting its forward movement in accordance with the body widths of the characters designated, of a motor-rack for advancing said units-wheel, motors for moving said rack in opposite directions and a finger-piece for controlling the application of power to said motors, whereby the units-wheel may be advanced during the indicating period and returned to normal position at the completion of a line of designations; substantially as described.

27. In a character-measuring mechanism for a designating-machine, such as described, the combination with a units-wheel with means for controlling the forward movement of the units-wheel in accordance with the body widths of the characters designated and a motor-rack for moving said units-wheel, of oppositely-arranged pressure-motors for moving said rack and units-wheel, a pressure-supply, ducts leading from said pressure-supply to the motors and a finger-piece controlling the admission of pressure to said ducts; substantially as described.

28. In a designating apparatus, the combination with the designating mechanism, the operating-levers, the motors for moving said levers and the finger-pieces controlling said motors, of a units-wheel, a motor for advancing said units-wheel, a units-rack movable into and out of engagement with said units-wheel, a series of stops connected with the operating-levers for arresting the movement of the units-rack and units-wheel and projections on said stops for moving the units-rack into and out of engagement with the units-wheel; substantially as described.

29. In a designating apparatus, the combination with the designating mechanism, a series of operating-levers, the series of motors and the finger-pieces controlling said motors, of the units-wheel, the motor controlling said units-wheel, a finger-piece controlling said motor, a units-rack, a units-rack carrier, a series of stops for limiting the movement of the units-rack and projections on said stops for coöperating with the units-rack carrier to move the units-rack into and out of mesh with the units-wheel.

30. In a designating apparatus, the combination with the designating mechanism, the series of operating-levers, the series of motors for said levers, the finger-pieces controlling said motors, the units-wheel, the units-wheel motor and the finger-piece controlling said motor, of a units-rack, a units-rack carrier, a series of stops for limiting the movement of the units-rack connected with the operating-levers and an elastic take-up interposed between the stops and units-rack carrier; substantially as described.

31. In a designating apparatus, the combination with the series of punches for making the character designations, the series of levers with which said punches are connected, the series of motors for operating said levers and finger-pieces controlling said motors, of the units-wheel, the units-wheel motor, the finger-pieces controlling said units-wheel motor, the units-rack, the units-rack carrier, the series of stops for limiting the movement of the units-rack and the spring-pressed wing interposed between the stops and units-rack carrier; substantially as described.

32. In a designating apparatus, the combination with the punches for making character designations, the series of operating-levers for said punches, the series of motors for said levers, the finger-pieces controlling said motors, the units-wheel, the units-wheel motor and the finger-piece controlling said motor, of the units-rack, the pivoted units-rack carrier, the series of stops connected with the operating-levers for limiting the movement of the units-rack, the projections on said stops and the spring-pressed wing pivoted on the units-rack carrier and coöperating with said projections for moving the units-rack into mesh with the units-wheel; substantially as described.

33. In a character-designating apparatus, the combination with the designating mechanism, finger-pieces controlling the same, the units-wheel and the units-wheel motor, of the units-rack, the units-rack carrier, a series of stops for limiting the movement of the units-rack, the wing pivoted on said units-rack carrier and coöperating with the stops to move the rack into mesh with the units-wheel, the spring connected with said wing and the adjustable stop for limiting the movement of the wing; substantially as described.

34. In a designating apparatus, the combination with the designating mechanism, the finger-pieces controlling the same, the units-wheel, the motor for said units-wheel, and the series of stops controlled by the designating mechanism, of the units-rack, the units-rack carrier movable toward and from the units-wheel, the locking-dog for the units-wheel operated by the units-rack carrier and mechanism interposed between the units-rack carrier and stops whereby the units-rack carrier is operated and in turn operates the locking-dog; substantially as described.

35. In a designating apparatus, the combination with the designating mechanism, finger-pieces controlling the same, the units-wheel with means for advancing the same during the designating period and for resetting the same, of a units-rack, units-rack carrier, stops for limiting the movement of the units-rack and for operating the units-rack carrier, a locking-dog for the units-wheel, a push-rod connected with said dog, a loose connection between said push-rod and units-rack carrier, and a resetting mechanism for operating said push-rod to release the dog from engagement with the wheel independently of the movement of the units-rack carrier; substantially as described.

36. In an apparatus such as described, the combination of the following elements, to wit, a series of keys for designating characters of unvarying width; a key for designating characters or spaces variable as to width; a series of keys representing different degrees of variation for the variable characters or spaces; a movable chart containing a plurality of rows or sets of characters, the latter having reference to keys of the characters representing variation in width of the variable characters and spaces; an indicator or pointer; mechanism controlled by the keys for the unvarying and variable width characters or spaces for shifting the position of the chart, with respect to the indicator, from one character to another in a set or row; and mechanism controlled by the key for variable-width characters or spaces for shifting the position of the indicator with relation to the chart from one row or series of characters to another; whereby the operation of the key for denoting characters or spaces of variable width will effect a transfer of the indicator from one set or series of charted characters to another; substantially as described.

37. In an apparatus such as described, the combination with the designating mechanism, embodying character-designating keys, one of which designates characters the body width of which is adapted to be varied for justification, of an indicating mechanism embodying a chart having sets or rows of characters referring to different numbers of characters in a line the body widths of which are adapted to be varied and the characters in each set or row of which have reference to the normal body width of the characters designated, and a pointer or indicator for registering with said characters on the chart, said chart being movable in one direction with respect to the pointer and the pointer being movable in a direction transverse to the movement of the chart, the movement of the chart being controlled by all of the character-designating keys causing registration with characters in a row or set, and the movement of the pointer being controlled by the key for designating characters whose body width is to be varied for causing registration with different sets or rows of charted characters.

38. The combination in an apparatus such as described, embodying character-designating keys, one of which designates justification characters adapted to have their body widths varied, a units-wheel controlled by the designating-keys, and a chart or dial controlled by the units-wheel, of a pointer for registering with said chart and connections between said pointer and the justification-character-designating key independent of the units-wheel, whereby said chart will be controlled by the designating-keys to register units of body width of the characters designated and the pointer will be controlled by the justification-character-designating key to register the number of such characters designated; substantially as described.

39. In a keyboard, the combination of the following elements, to wit, designating-keys for designating characters having constant but different body widths, a designating-key for designating characters or spaces having variable body width, a units-wheel controlled by the designating-keys and having an angular movement proportioned to the normal body width of the characters designated, a movable chart controlled by said units-wheel and an indicator or pointer for registering with said chart controlled by the key for designating characters or spaces having variable body width; substantially as described.

40. In an apparatus, such as described, for designating characters in the record strip or ribbon, the combination of the following elements, to wit, keys for designating characters having constant body widths, a key for designating characters or spaces having a variable body width, keys for designating justification, a units-wheel controlled in its advance movement by said character and space designating keys in accordance with the widths of the characters designated, a chart movable in unison with said units-wheel and having sets of characters the number of sets corresponding to the number of possible operations in any one line of the key for designating characters having variable body widths, a justification-indicator for registering with the characters on the chart and connections between said indicator and the mechanism for designating characters having variable body width; substantially as described.

41. In a character-designating apparatus, the combination with the key-controlled-designating mechanism, of an indicating mechanism embodying an indicating chart or dial, a motor for operating said indicating mechanism, and a mechanism controlled by the keys for controlling the indicating mechanism and its motor; substantially as described.

42. In a character-designating apparatus, the combination with the designating mechanism and keys controlling the same, of indicating mechanism embodying two elements, one of which operates throughout the entire line of indications and the other of which operates only during a final and predetermined portion of said line of indications, and a motor for driving the last-named element controlled by the movement of the first-mentioned element; substantially as described.

43. In a character-designating apparatus, the combination with the character-designating mechanism and finger-pieces controlling the same, of an indicating mechanism embodying a chart and a motor for operating said indicating mechanism, a units-wheel, a motor for advancing the units-wheel in accordance with the body widths of the characters indicated, and connections between said motor and the chart-motor for operating the latter throughout a final and predetermined portion of the line of designations; substantially as described.

44. In a character-designating apparatus, the combination with the designating mechanism and finger-pieces controlling the same, of an indicating mechanism, a normally-inactive secondary motor for said indicating mechanism, a motor-rack and normally-active motor for advancing said rack and connections between the normally-active and normally-inactive motors for rendering the latter active at a predetermined point in the movement of the former.

45. In an indicating apparatus, the combination with the indicating mechanism, finger-pieces controlling the same, the motor-rack controlled by the indicating mechanism to advance in accordance with the body widths of the characters designated, the pressure-motor for advancing said rack and a pressure-supply for said motor, of a justification-indicator, a motor for operating said justification-indicator, connections between said justification-indicator and rack, and connections between the justification-indicator motor and rack-motor, whereby at a predetermined point in the movement of the latter, pressure will be admitted to the justification-indicator motor to render the same operative; substantially as set forth.

46. In a character-designating apparatus, the combination with the character-indicating mechanism, and finger-pieces controlling the same, of the justification motor-rack controlled in its advance movement by the character-indicating mechanism, a motor-cylinder and piston for advancing said rack, a pressure-supply for said cylinder, a justification-indicator controlled by said motor-rack, a pressure-motor for advancing the justification-indicator, comprising a piston and cylinder and connections between said cylinders; whereby upon the advance of the motor-rack and its piston to a predetermined point, pressure will be admitted to the justification-motor cylinder for relieving the motor-rack from the labor of advancing the justification-indicator; substantially as described.

47. In a character-designating apparatus, the combination with the designating mechanism and finger-pieces controlling the same, the units-wheel controlled in its advance by the character-designating mechanism, the motor-rack and motor for advancing the units-wheel and the justification-indicator, of a supplemental rack mounted on the motor-rack and adapted to operate the justification-indicator at a predetermined point in the travel of the motor-rack; substantially as described.

48. In a character-designating apparatus, the combination with the designating mechanism, and finger-pieces controlling the same, the units-wheel controlled in its advance by the character-designating mechanism, the motor-rack and motor for advancing the units-wheel and the justification-indicator, of a supplemental rack movably mounted on the motor-rack and adapted to operate the justification-indicator at a predetermined point in the travel of the motor-rack; substantially as described.

49. In a character-designating apparatus, the combination with the designating mechanism, and finger-pieces controlling the same, the units-wheel controlled in its advance by the character-designating mechanism, the motor-rack and motor for advancing the units-wheel and the justification-indicator, of a yielding supplemental rack movably mounted on the motor-rack and adapted to operate the justification-indicator at a predetermined point in the travel of the motor-rack; substantially as described.

50. In a character-designating apparatus, the combination with the designating mechanism, finger-pieces controlling the same, a motor-rack, the units-wheel operated thereby, and controlled in its movement by the character-designating mechanism and the indicating mechanism embodying a shaft having a pinion thereon, of a supplemental rack yieldingly mounted on the motor-rack and adapted to mesh with the pinion on the indicating mechanism at a predetermined point in the travel of the motor-rack, and stops connected with said pinion and supplemental rack, respectively, for initiating the movement of the pinion and insuring the correct engagement of the supplemental rack and pinion; substantially as described.

51. In a character-designating apparatus, the combination with the character-designating mechanism and finger-pieces controlling said mechanism, the units-wheel, the motor-rack for driving said units-wheel, the motor and resetting cylinders and pistons for said rack, a pressure-supply and ducts leading from said motor and resetting cylinders to said pressure-supply, of a rock-shaft, valves controlled by said rock-shaft and interposed in the said ducts and operating to simultaneously open communication between one of said cylinders and the pressure-supply and close communication between the opposite of said cylinders and the pressure-supply, and a finger-piece controlling said rock-shaft; substantially as described.

52. In a character-designating apparatus, the combination with the character-designating mechanism and finger-pieces controlling the same, the units wheel and rack for operating the same, the motor for advancing the units-wheel and the indicator controlled by the units-wheel, of a resetting mechanism comprising a motor-cylinder, piston, and pressure-supply, a duct leading from said cylinder to the pressure-supply, a valve interposed in said duct, and a finger-piece controlling said valve; substantially as described.

53. In a character-designating apparatus, the combination with the character-designating mechanism and finger-pieces, controlling the same, the motor for advancing the units-wheel, and the indicator controlled by the units-wheel, of a resetting mechanism comprising a motor-cylinder piston and pressure-supply, a duct leading from said cylinder to the pressure-supply, a valve interposed in said duct, a finger-piece controlling said valve, and the throttling-valve located in said duct and operating to permit a free egress of pressure from said cylinder, but adapted to retard the ingress of pressure to said cylinder; substantially as described.

54. In a character-designating apparatus, the combination with the designating mechanism, the justification-indicating mechanism, a resetting mechanism and a rock-shaft controlling the resetting of the justification-indicating mechanism, of a motor for operating said rock-shaft and a finger-piece controlling said motor; substantially as described.

55. In a character-designating apparatus, the combination with the character-designating mechanism and finger-pieces controlling the same, the indicating mechanism embodying a movable chart or dial and a movable pointer or indicator for registering therewith, the motors for the chart or dial, a pawl-and-ratchet mechanism for operating the pointer, a rock-shaft controlling said motor, a projection on said rock-shaft for releasing the pawls on the pointer-operating mechanism, and a finger-piece controlling said rock-shaft; substantially as described.

56. In a character-designating apparatus, the combination with the indicating mechanism, for registering the body widths of the characters designated actuating mechanism therefor with pressure-motors for advancing and resetting said indicating mechanism, of a spring-pressed rock-shaft controlling the admission of pressure to said motors, a pressure-motor for actuating said rock-shaft against the tension of its spring, and a finger-piece controlling said rock-shaft and motor; substantially as described.

57. In a character-designating apparatus, the combination with the indicating mechanism embodying a chart having horizontal rows of indications thereon, motors for operating said indicating mechanism with means for controlling the same in accordance with the body widths of the characters designated, and a vertically-movable pointer for registering with the indications on said chart adapted to be moved vertically in accordance with the number of variable body characters designated, of a rock-shaft controlling the admission of pressure to the indicating-mechanism motor and a projection on said rock-shaft to reset the mechanism; substantially as described.

58. An indicating mechanism for character-designating apparatus, embodying a charted cylinder with mechanism interposed between said charted cylinder and the designating mechanism for rotating the same in accordance with the body widths of the characters designated and a pointer for registering with the indications on said cylinders; substantially as described.

59. An indicating mechanism for use in a character-designating apparatus, adapted to designate characters having different but constant body widths and also characters having variable body widths, said indicating mechanism embodying a charted cylinder, a units-wheel controlling said cylinder and adapted to advance in accordance with the body widths of the characters designated, and a motor for impelling said units-wheel, of a pointer controlled by the designating mechanism for characters of variable body widths for registering with the indications on the charted cylinder; substantially as described.

60. In an indicating mechanism for character-designating apparatus, the combination with a units-wheel controlled in its advance in accordance with the body widths of the characters designated, a pinion connected with said units-wheel and a motor-impelled rack geared with the upper side of said units-wheel, of a second shaft having a pinion thereon located above the rack, a supplemental rack carried by the second rack for meshing with the last-mentioned pinion and an indicating mechanism controlled by said second shaft; substantially as described.

61. In an indicating mechanism for a character-designating apparatus, such as described, the combination with a motor-impelled rack, of a units-wheel having a pinion connected therewith and gearing with the under side of said rack, and an indicating mechanism having a pinion connected therewith gearing with the upper side of said rack; substantially as described.

62. In a designating apparatus such as described, the combination with the units-wheel and a member, such as the units-rack, movable in two directions, the one for engagement or disengagement with the units-wheel and the other for advancing with the units-wheel, of a series of interceptors or stops movable into the path traversed by said units-rack when advancing in unison with the units-wheel, and provided with shoulders for effecting the engagement of said member or units-rack with the units-wheel; substantially as described.

TOLBERT LANSTON.

Witnesses:
ALEXANDER S. STEUART,
THOMAS DURANT.